US011137666B2

(12) United States Patent
Iwase et al.

(10) Patent No.: US 11,137,666 B2
(45) Date of Patent: Oct. 5, 2021

(54) CONTROL DEVICE AND CONTROL METHOD

(71) Applicant: SONY CORPORATION, Tokyo (JP)

(72) Inventors: Ayako Iwase, Kanagawa (JP); Daisuke Hiro, Kanagawa (JP); Lyo Takaoka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/772,628

(22) PCT Filed: Sep. 1, 2016

(86) PCT No.: PCT/JP2016/075730
§ 371 (c)(1),
(2) Date: May 1, 2018

(87) PCT Pub. No.: WO2017/085982
PCT Pub. Date: May 26, 2017

(65) Prior Publication Data
US 2019/0121220 A1 Apr. 25, 2019

(30) Foreign Application Priority Data
Nov. 16, 2015 (JP) .............................. JP2015-223816

(51) Int. Cl.
G03B 13/02 (2021.01)
G03B 17/14 (2021.01)
(Continued)

(52) U.S. Cl.
CPC ............... *G03B 17/14* (2013.01); *G03B 3/10* (2013.01); *G03B 5/00* (2013.01); *G03B 7/26* (2013.01);
(Continued)

(58) Field of Classification Search
CPC ....... G03B 3/10; G03B 13/20; H04N 5/23293
See application file for complete search history.

(56) References Cited

U.S. PATENT DOCUMENTS 8,416,333 B2 * 4/2013 Nakai ................ H04N 5/23293
348/333.06
2007/0276513 A1 * 11/2007 Sudo .................... H04N 1/0035
700/75
(Continued)

FOREIGN PATENT DOCUMENTS

| CN | 101296318 A | 10/2008 |
| CN | 102998877 A | 3/2013 |
| JP | 2008-268726 A | 11/2008 |
| JP | 2013-057837 A | 3/2013 |
| JP | 2013-078075 A | 4/2013 |

(Continued)

OTHER PUBLICATIONS

International Search Report and Written Opinion of PCT Application No. PCT/JP2016/075730, dated Dec. 6, 2016, 09 pages of ISRWO.

*Primary Examiner* — Minh Q Phan
(74) *Attorney, Agent, or Firm* — Chip Law Group

(57) ABSTRACT

A control device, control method, and program, capable of executing a process suitable for a state of proximity of an eye with respect to a viewfinder, and an operating state with respect to an operation display portion. The control device includes a process control unit that executes a process related to shooting or playback of an image, on a basis of whether proximity of an eye with respect to a viewfinder is detected, and detection of an operation state with respect to an operation display portion.

18 Claims, 19 Drawing Sheets

(51) Int. Cl.
*G03B 17/02* (2021.01)
*G03B 7/26* (2021.01)
*G06F 3/0488* (2013.01)
*H04N 5/232* (2006.01)
*G03B 3/10* (2021.01)
*G03B 5/00* (2021.01)
G03B 17/20 (2021.01)
G03B 17/18 (2021.01)

(52) U.S. Cl.
CPC ........... *G03B 17/02* (2013.01); *G06F 3/0488* (2013.01); *H04N 5/23216* (2013.01); *H04N 5/23293* (2013.01); *G03B 17/18* (2013.01); *G03B 17/20* (2013.01); *G03B 2205/0046* (2013.01)

(56) References Cited

U.S. PATENT DOCUMENTS

| | | | |
|---|---|---|---|
| 2008/0267607 A1 | 10/2008 | Mori | |
| 2011/0109581 A1* | 5/2011 | Ozawa | G06F 3/0481 345/173 |
| 2011/0267526 A1* | 11/2011 | Ishihara | G03B 3/10 348/333.01 |
| 2013/0064533 A1 | 3/2013 | Nakata | |
| 2013/0083222 A1 | 4/2013 | Matsuzawa et al. | |

FOREIGN PATENT DOCUMENTS

| | | |
|---|---|---|
| JP | 2014-038195 A | 2/2014 |
| JP | 2014-161066 A | 9/2014 |
| JP | 2015-045764 A | 3/2015 |

* cited by examiner

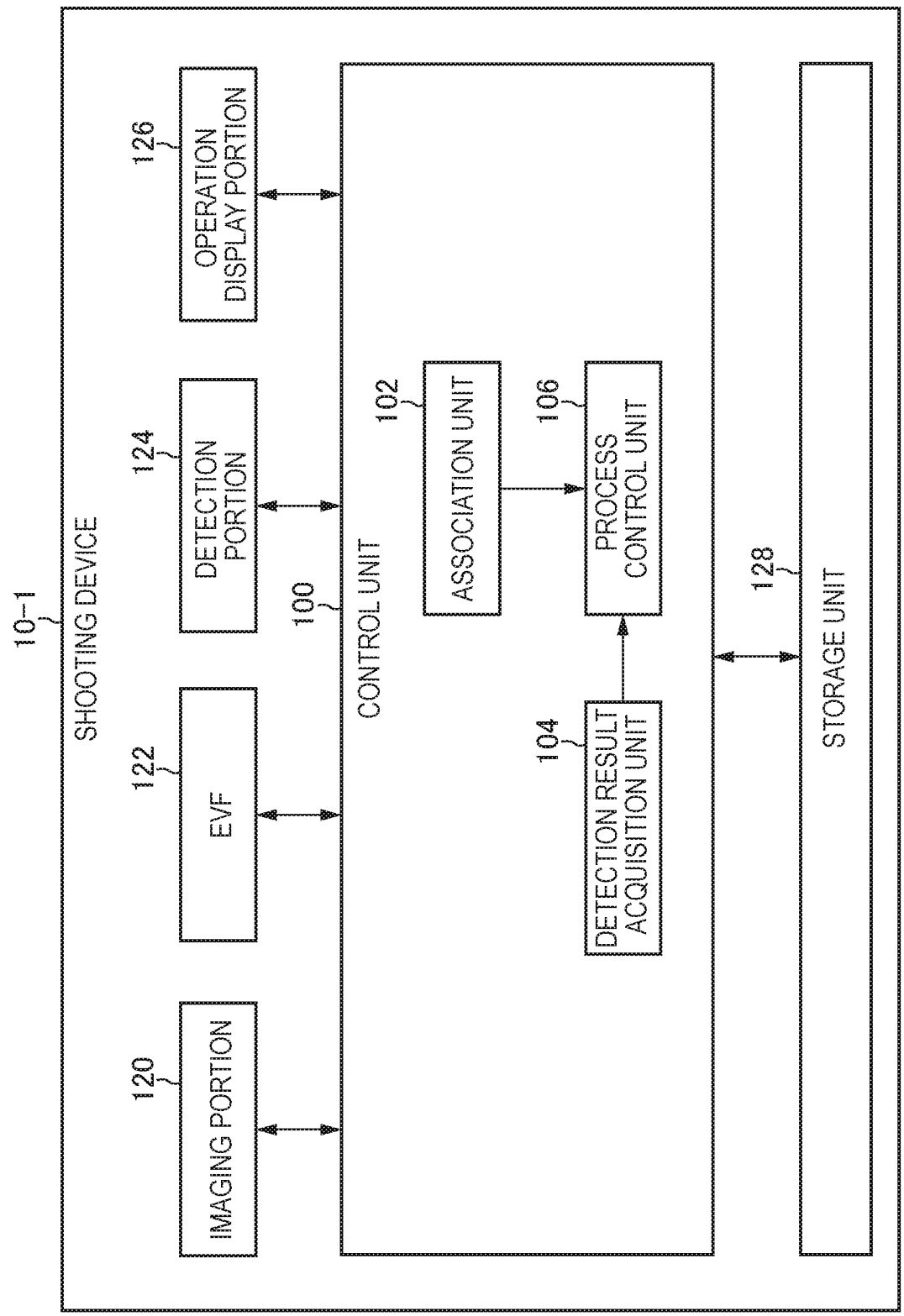

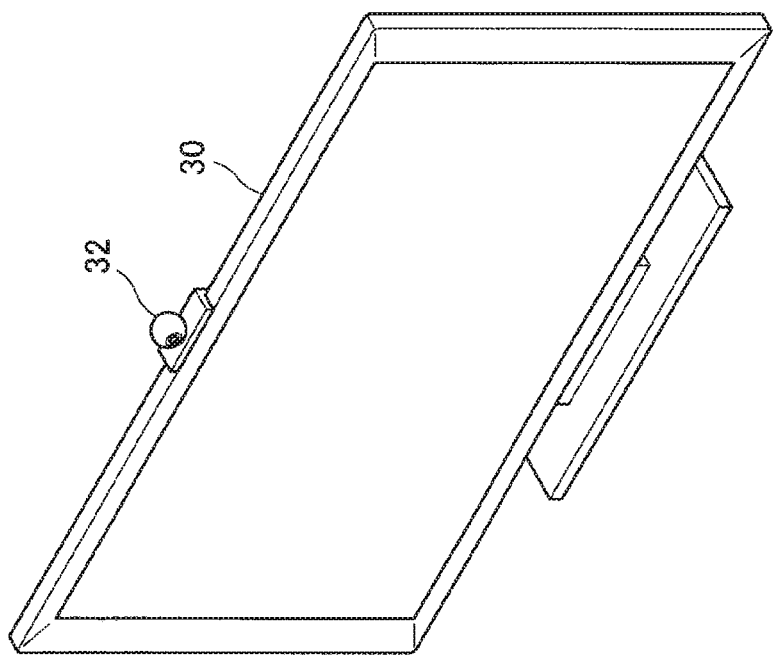
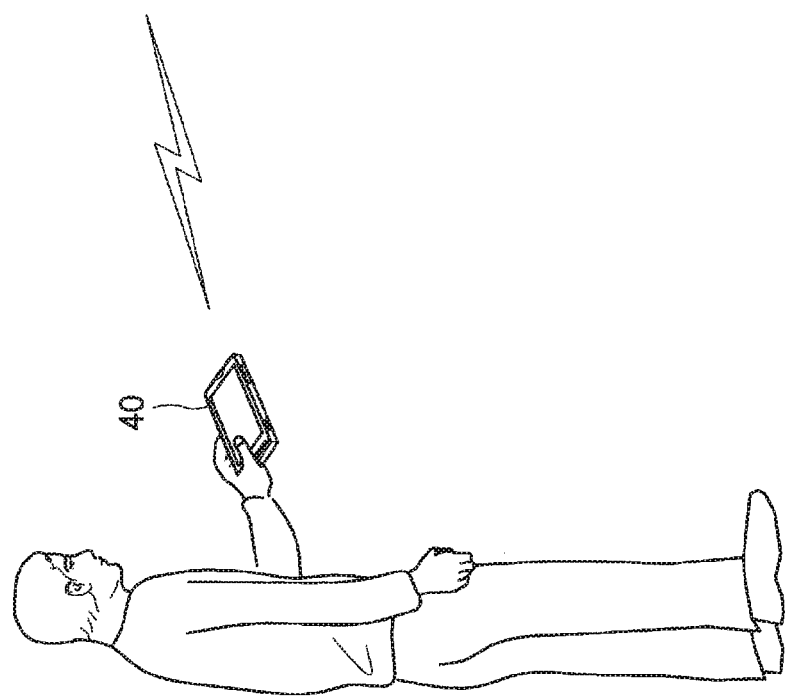
FIG. 19

CONTROL DEVICE AND CONTROL METHOD

CROSS REFERENCE TO RELATED APPLICATIONS

This application is a U.S. National Phase of International Patent Application No. PCT/JP2016/075730 filed on Sep. 1, 2016, which claims priority benefit of Japanese Patent Application No. JP 2015-223816 filed in the Japan Patent Office on Nov. 16, 2015. Each of the above-referenced applications is hereby incorporated herein by reference in its entirety.

TECHNICAL FIELD

The present disclosure relates to a control device, a control method, and a program.

BACKGROUND ART

In recent years, digital cameras equipped with viewfinders such as an electronic viewfinder (EVF) have become popular. With such a digital camera, a user is able to easily determine the composition of a shot image, and adjust the focus, by looking through the viewfinder.

Also, digital cameras equipped with touch panels are also being developed. For example, Patent Literature 1 describes technology that causes a live view to be displayed on a rear display portion in a case where a user is not bringing an eye close to the viewfinder, and causes a live view to be displayed on a display screen of the viewfinder in a case where the user is bringing an eye close to the viewfinder. Also, Patent Literature 2 describes technology that enables to user to switch modes or the like by touching an icon displayed on a rear display, while looking through the viewfinder.

CITATION LIST

Patent Literature

Patent Literature 1: JP 2014-38195A
Patent Literature 2: JP 2014-161066A

DISCLOSURE OF INVENTION

Technical Problem

However, with the technology described in Patent Literature 2, the same display screen is displayed on the rear display regardless of whether the user is bringing an eye close to the viewfinder. That is, with the technology described in Patent Literature 2, it is not possible to make the process to be executed different in accordance with whether the user is bringing an eye close to the viewfinder.

Therefore, the present disclosure proposes a novel and improved control device, control method, and program, capable of executing a process suitable for a state of proximity of an eye with respect to a viewfinder, and an operating state with respect to an operation display portion.

Solution to Problem

According to the present disclosure, there is provided a control including a process control unit that executes a process related to shooting or playback of an image, on a basis of whether proximity of an eye with respect to a viewfinder is detected, and detection of an operation state with respect to an operation display portion.

In addition, according to the present disclosure, there is provided a control method including executing a process related to shooting or playback of an image, on a basis of whether proximity of an eye with respect to a viewfinder is detected, and detection of an operation state with respect to an operation display portion.

In addition, according to the present disclosure, there is provided a program for causing a computer to function as a process control unit that executes a process related to shooting or playback of an image, on a basis of whether proximity of an eye with respect to a viewfinder is detected, and detection of an operation state with respect to an operation display portion.

Advantageous Effects of Invention

As described above, according to the present disclosure, it is possible to execute a process suitable for a state of proximity of an eye with respect to a viewfinder, and an operating state with respect to an operation display portion. Note that the effects described here are not necessarily limited and may be any of the effects described in the present disclosure.

BRIEF DESCRIPTION OF DRAWINGS

FIG. 4 is a functional block diagram illustrating the internal configuration of the shooting device 10-1 according to the embodiment.

FIG. 19 is an explanatory view illustrating a configuration example of a control system according to a modified example of the present disclosure.

MODE(S) FOR CARRYING OUT THE INVENTION

Figure 1:
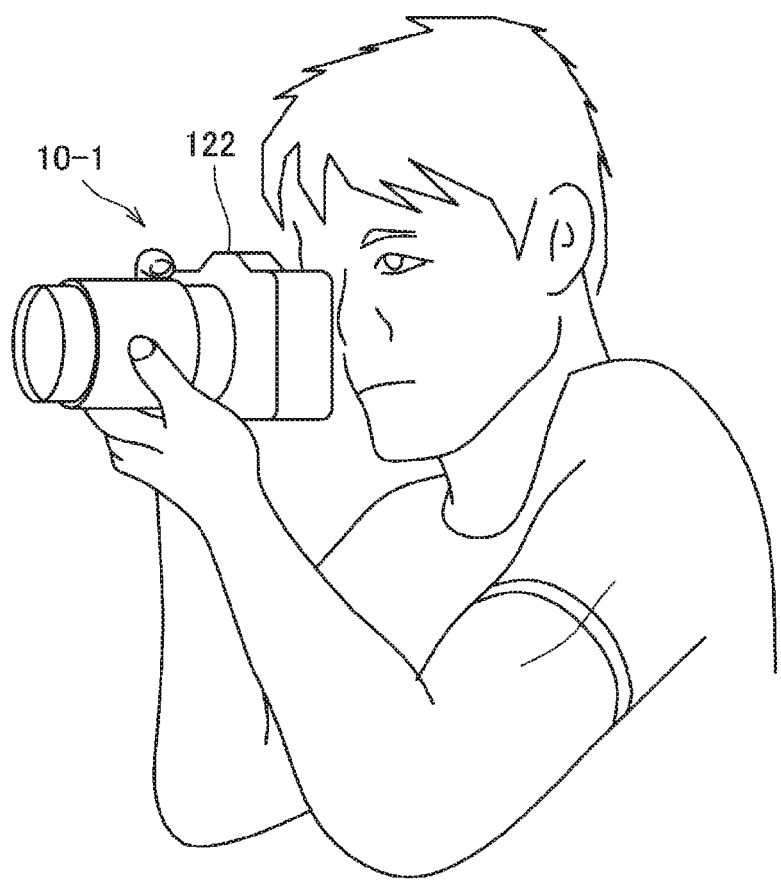
FIG. 1 is an explanatory view illustrating a user shooting using a shooting device 10-1 according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, in the present specification and drawings, a plurality of constituent elements having substantially the same functional configuration may be distinguished by adding a different letter of the alphabet after the same reference numeral. For example, a plurality of components having substantially the same functional configuration will be distinguished from each other, like operation button 132a and operation button 132b, as necessary. However, in cases where there is no particular need to distinguish among each of a plurality of constituent elements having substantially the same functional configuration, only the same reference numeral will be used. For example, in a case where there is no particular need to distinguish between the operation button 132a and the operation button 132b, the operation buttons will simply be referred to as operation buttons 132.

Also, the "Mode(s) for Carrying Out the Invention" will be described in the following order.

1. Basic configuration of shooting device 10-1
2. Detailed description of the embodiment
3. Practical use examples
4. Modified examples <<1. Basic Configuration of Shooting Device 10-1>>

<1-1. Basic Configuration>

First, the basic configuration of a shooting device 10-1 according to an embodiment of the present disclosure will be described with reference to FIG. 1. FIG. 1 is an explanatory view illustrating a user shooting using the shooting device 10-1.

The shooting device 10-1 is one example of the control device of the present disclosure. This shooting device 10-1 is a device for shooting an image of an outside environment, or playing back an image that has been shot. Here, shooting is actually recording an image or displaying a monitor image.

Also, the shooting device 10-1 includes a viewfinder. Here, the viewfinder is a viewing window for determining the composition before shooting, and for focusing, for example, by the user bringing his or her eye close to (hereinafter, this may also be referred to as "looking through") the viewfinder. For example, as illustrated in FIG. 1, the viewfinder is an EVF 122. The EVF 122 displays image information acquired by an imaging element (not illustrated) included in the shooting device 10-1.

However, the viewfinder is not limited to this example, and may also be an optical viewfinder. Note that hereinafter, a description will be given focusing on an example in which the viewfinder (provided in the shooting device 10-1) is the EVF 122.

Also, the shooting device 10-1 includes an operation display portion 126 on a rear side of a case, for example. This operation display portion 126 functions as a display portion that displays a variety of types of information such as an image that has been shot, and an operation portion that detects an operation by the user. The function of the display portion is realized by, for example, a liquid crystal display (LCD) device, or an organic light emitting diode (OLED) device or the like. Also, the function of the operation portion is realized by a touch panel, for example.

<1-2. Background>

Incidentally, in the past, digital cameras equipped with EVF have become common. Here, an example of a workflow relating to shooting and playback using a well-known digital camera will be described with reference to FIG. 2 and FIG. 3 in order to clearly illustrate the characteristics of the present disclosure.

Figure 2:
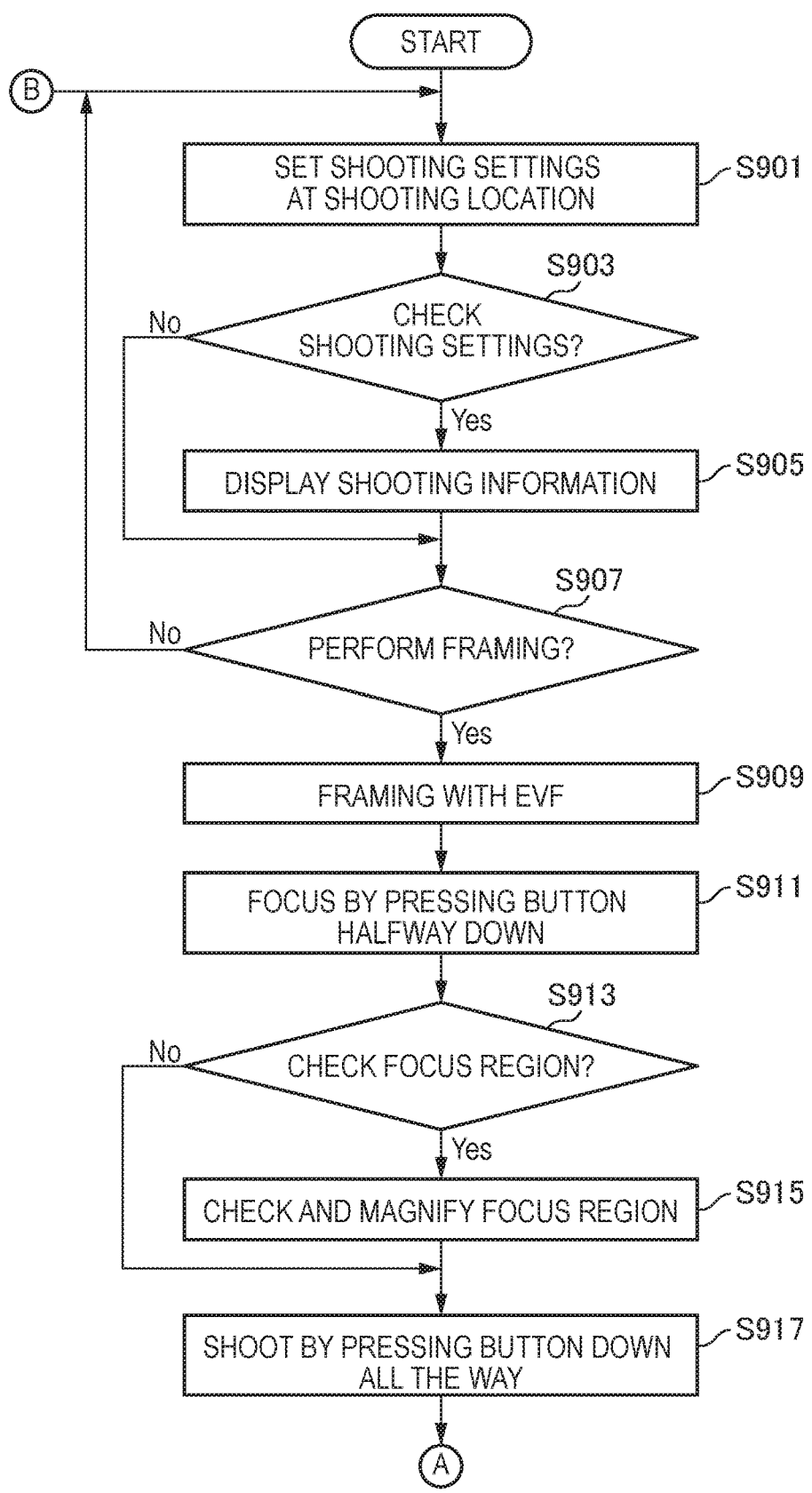
FIG. 2 is a flowchart illustrating an example of a workflow related to shooting and playback.

As illustrated in FIG. 2, first, the user sets the shooting settings at the shooting location (S901). Then, in a case where the user will check the content of the set shooting settings (S903: Yes), the user presses a predetermined button on the digital camera, for example. The digital camera then displays the set shooting information on a rear display of the digital camera (S905). Then, if the user wishes to shoot (S907: Yes), the user performs framing by looking through the EVF (S909).

Then, when a shutter button is pressed half way down, for example by the user, the digital camera performs a focusing process (S911). If the user then wishes to magnify a partial region centered on the position where the subject is in focus (hereinafter, this may be referred to as the focus region) (S913: Yes), the user presses a custom button to which magnification of the focus region has been assigned, for example. The digital camera then magnifies and displays the focus region (S915).

Then, when the shutter button is pressed all the way down, for example, by the user, the digital camera performs shooting (S917).

Figure 3:
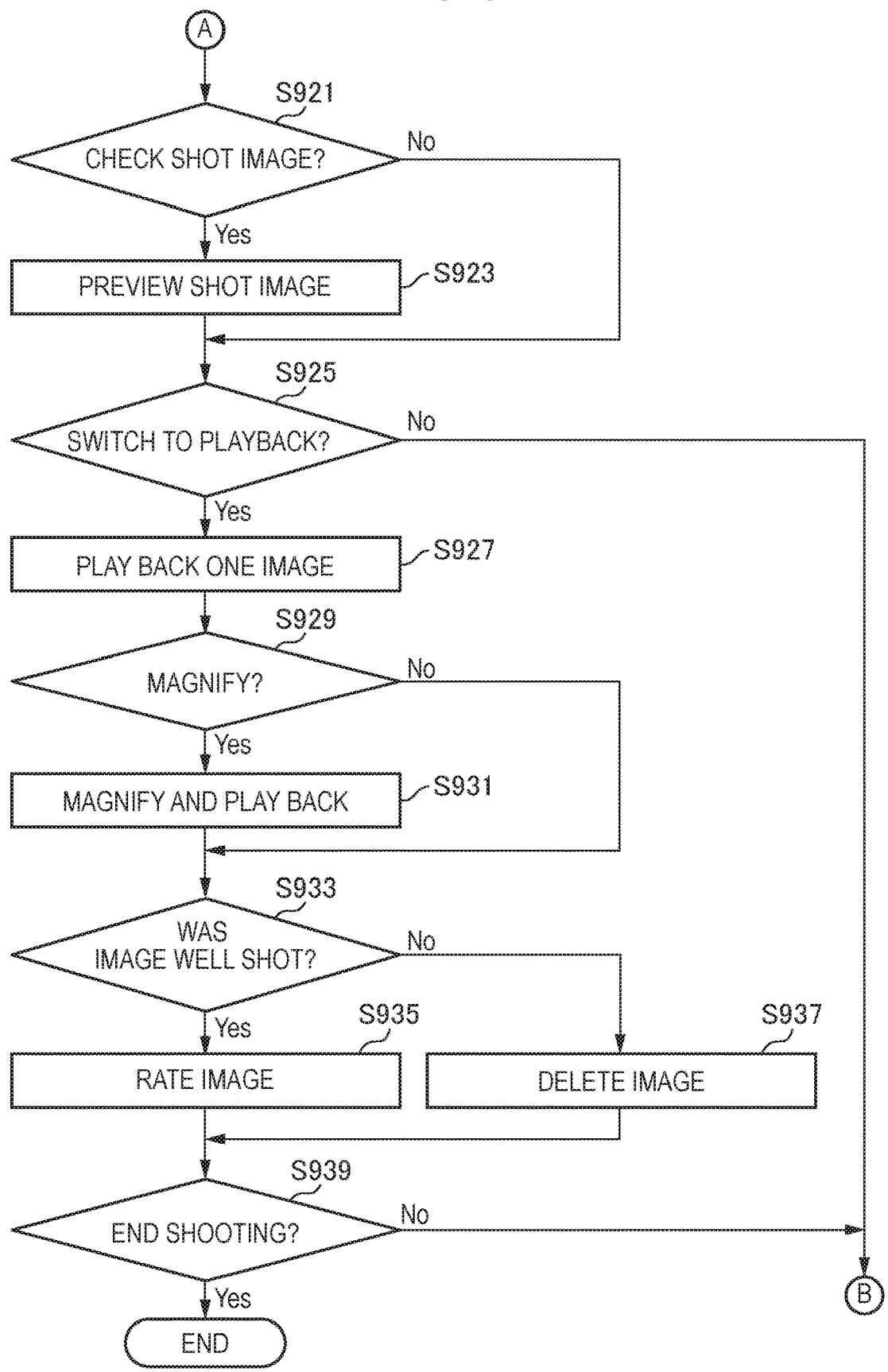
FIG. 3 is a flowchart illustrating an example of a workflow related to shooting and playback.

Here, the operation after S917 will be described with reference to FIG. 3. As illustrated in FIG. 3, if the user wishes to check the shot image after S917 (S921: Yes), the user performs a predetermined operation for preview-displaying the shot image. The digital camera then preview-displays the shot image in the EVF (S923). Note that if preview display is set to automatic display in advance, the shot image will automatically be preview-displayed in the EVF in S921 to S923.

Then, if the user does not wish to play back the shot image (S925: No), the operation in S901 is performed again. However, if the user does wish to play back the shot image (S925: Yes), the user presses a playback button provided on the digital camera, for example. The digital camera then plays back one image, that is, displays one image on the rear display (S927). Then, if the user wishes to magnify the played-back image (S929: Yes), the user presses a playback magnification button provided on the digital camera, for example. The digital camera then magnifies and displays the image being played back (S931). Then, if the user determines that the image being played back is an image that was well shot (S933: Yes), the user depresses a rating button provided on the digital camera, for example, or performs a predetermined input to give a rating. The digital camera then executes a rating process with respect to the image being played back (S935). However, if the user determines that the image being played back is an image that was not well shot (S933: No), the user depresses a delete button provided on the digital camera, for example. The digital camera then deletes the image being played back (S937). Alternatively, instead of S935 and S937, the digital camera may transfer the image being played back to another device such as a personal computer (PC) to which the digital camera is connected, on a basis of input by the user with respect to the other device, for example. The user can then also give rating or the like to the transferred image using the other device.

After S935 or S937, this workflow ends if the user wishes to end shooting (S939: Yes).

[1-2-1. Identification of the Problem]

As described above, with a well-known digital camera, the button to be depressed is different for each function as a general rule. Therefore, the user must press different buttons in order to execute desired functions. For example, in S905, S915, S923, S927, S931, S935, and S937 in the workflow described above, the user may be required to depress a different button in each step.

Also, depending on the arrangement of the buttons, the user may not be able to depress the desired button without changing his or her grip. As a result, it is difficult for the user to smoothly perform operations according to the workflow described above.

Therefore, the shooting device 10-1 according to the present embodiment was created with the above situation in mind. According to the present embodiment, the user is able to freely associate a process related to shooting or playback of an image with each combination of whether an eye is close to the EVF 122 and the touch state with respect to the operation display portion 126. Also, the user is able to more easily perform operations according to the workflow described above.

<<2. Detailed Description of the Embodiment>>

<2-1. Configuration>

Next, the configuration of the shooting device 10-1 according to the present embodiment will be described in detail. FIG. 4 is a functional block diagram illustrating the configuration of the shooting device 10-1 according to the present embodiment. As illustrated in FIG. 4, the shooting device 10-1 includes a control unit 100, an imaging portion 120, the EVF 122, a detection portion 124, the operation display portion 126, and a storage unit 128. Note that description of content that overlaps with the description above will be omitted below.

[2-1-1. Control Unit 100]

The control unit 100 comprehensively controls the operation of the shooting device 10-1 using hardware such as a central processing unit (CPU), read only memory (ROM), or random access memory (RAM), for example, built into the shooting device 10-1. Also, as illustrated in FIG. 4, the control unit 100 has an association unit 102, a detection result acquisition unit 104, and a process control unit 106.

[2-1-2. Association Unit 102]

The association unit 102 associates a combination of whether an eye is close to the EVF 122 and the operating state of the user with respect to the operation display portion 126, with a predetermined process related to shooting or playback of an image, on the basis of input by the user, for example. Accordingly, the user is able to associate each desired process with each combination of whether an eye is close to the EVF 122 and the operation state of the user with respect to the operation display portion 126. Here, the operation state is the state of a touch operation with respect to the operation display portion 126, or the state of a proximity operation (an operation based on a determination of proximity with respect to the operation display portion 126). Note that an example in which the operation state is the state of a touch operation will be described below.

Figure 5B:
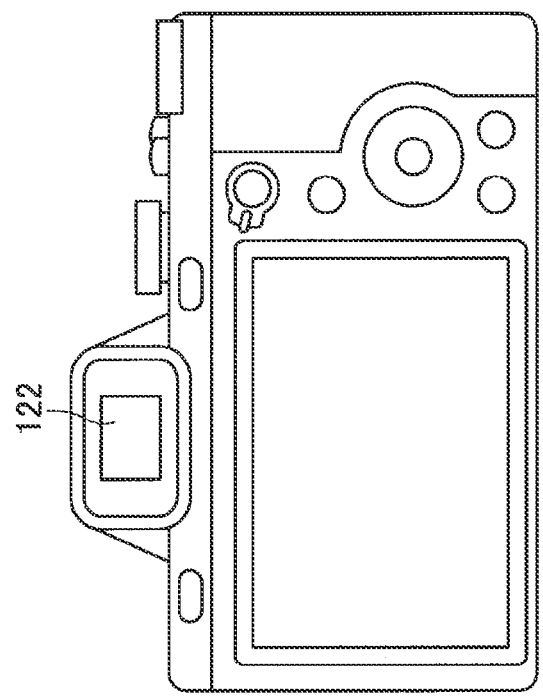
FIGS. 5(A) and 5(B) are explanatory views illustrating an example of states of proximity of an eye with respect to an EVF 122 according to the embodiment.
Figure 5A:
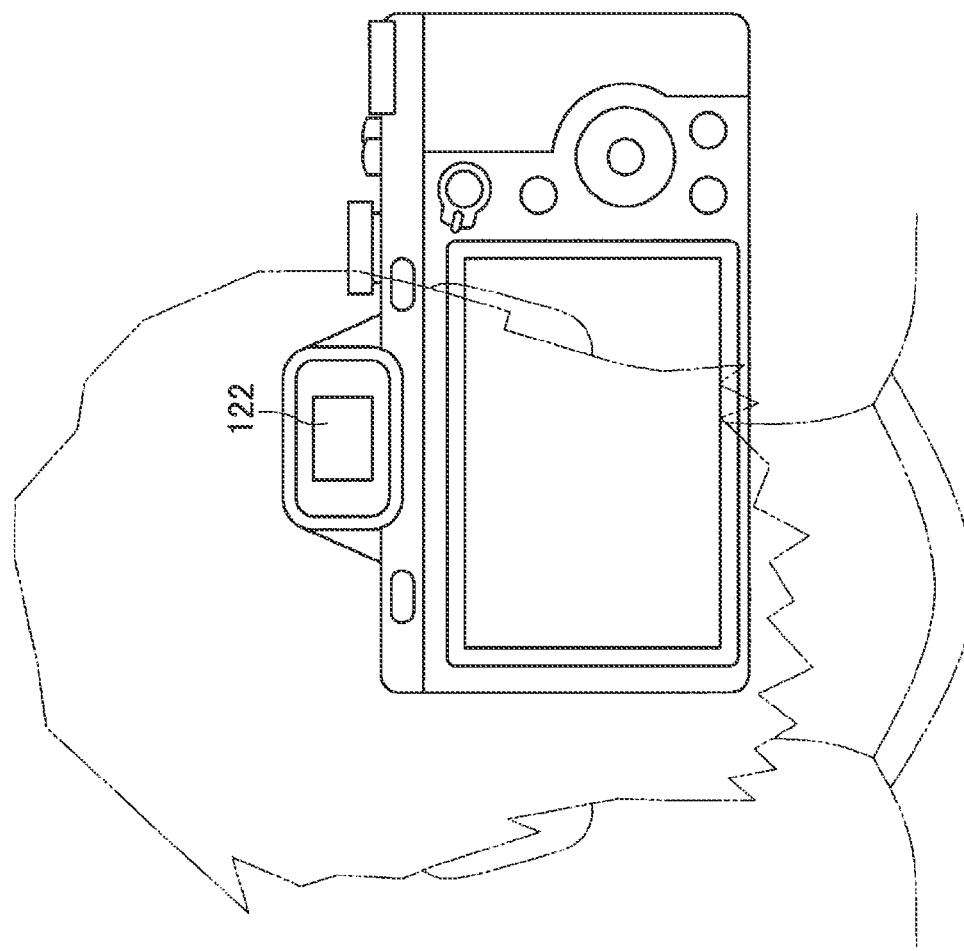
Figure 6A:
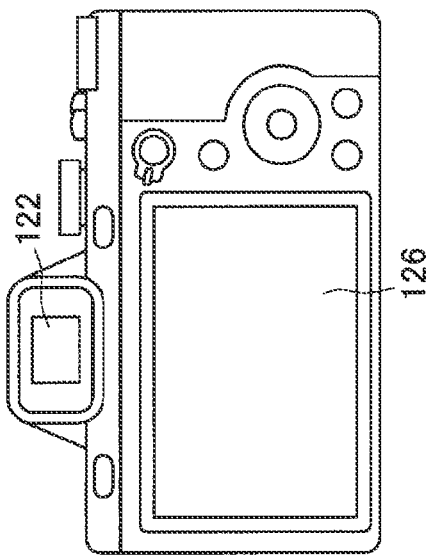
FIGS. 6(A), 6(B), 6(C), and 6(D) are explanatory views illustrating an example of distinguishing a touch state with respect to an operation display portion 126 according to the embodiment.
Figure 6B:
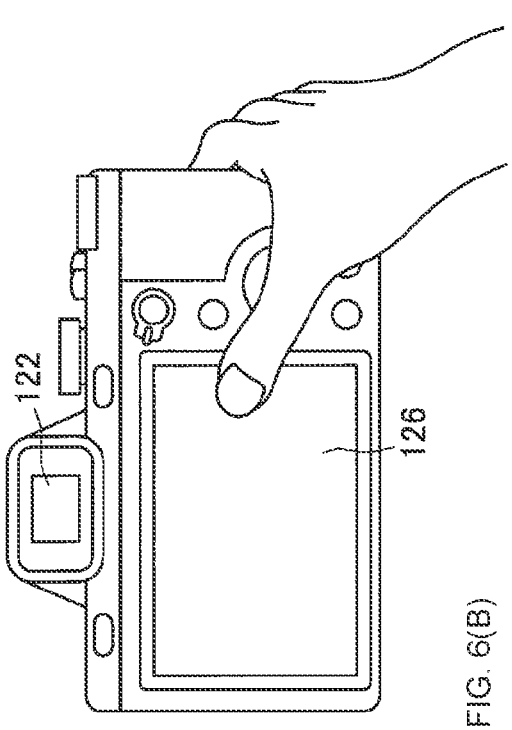
Figure 6C:
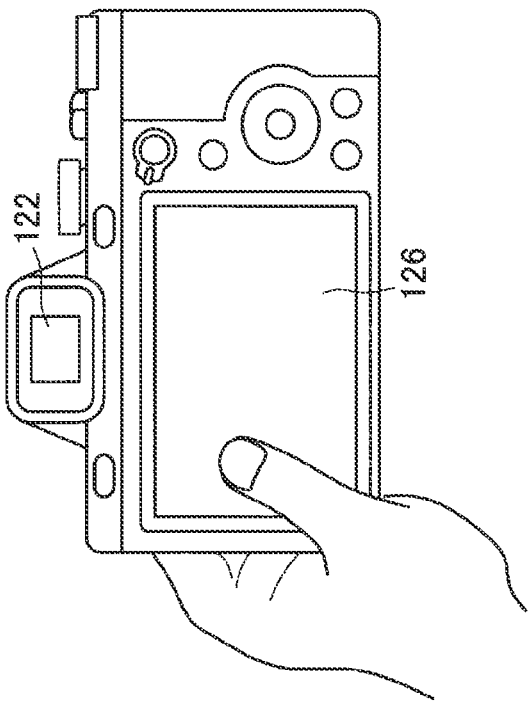
Figure 6D:
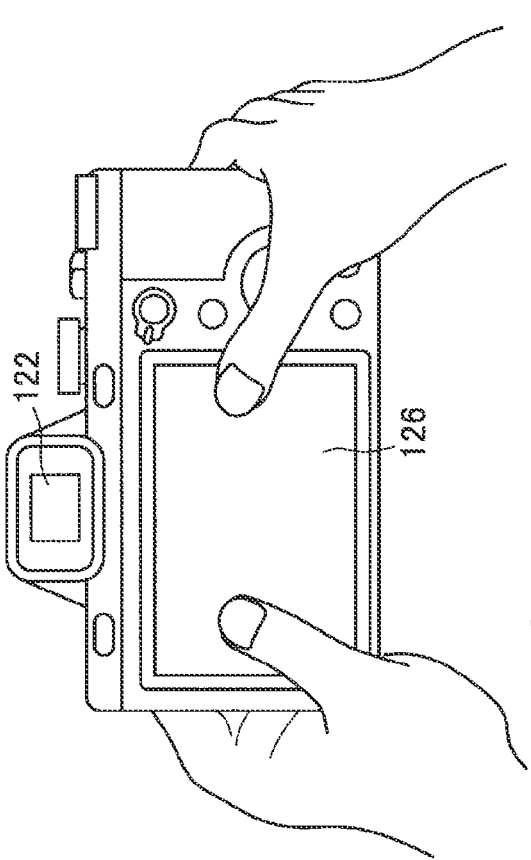

FIGS. 5(A) and 5(B) are explanatory views illustrating an example of states of proximity of an eye with respect to the EVF 122. FIG. 5(A) illustrates a case where the user is bringing his or her eye close to the EVF 122, and FIG. 5(B) illustrates a case where the user is not bringing his or her eye close to the EVF 122.

Also, the touch state is divided into four or more types, depending on the combination of the number of touch operations performed simultaneously with respect to the operation display portion 126 by each of two hands of the user, for example. For example, as illustrated in FIGS. 6(A), 6(B), 6(C), and 6(D), the touch state is divided into a case where the user is not touching the operation display portion 126 at all (FIG. 6(A)), a case where the user is touching the operation display portion 126 only with his or her right hand (FIG. 6(B)), a case where the case where the user is touching the operation display portion 126 only with his or her left hand (FIG. 6(C)), and a case where the user is touching the operation display portion 126 with both hands (FIG. 6(D)). Note that in a case where four touch states are defined, the number of combinations (of whether an eye is close to the EVF 122 and the touch state) is 8 (=2×4).

Figure 7:
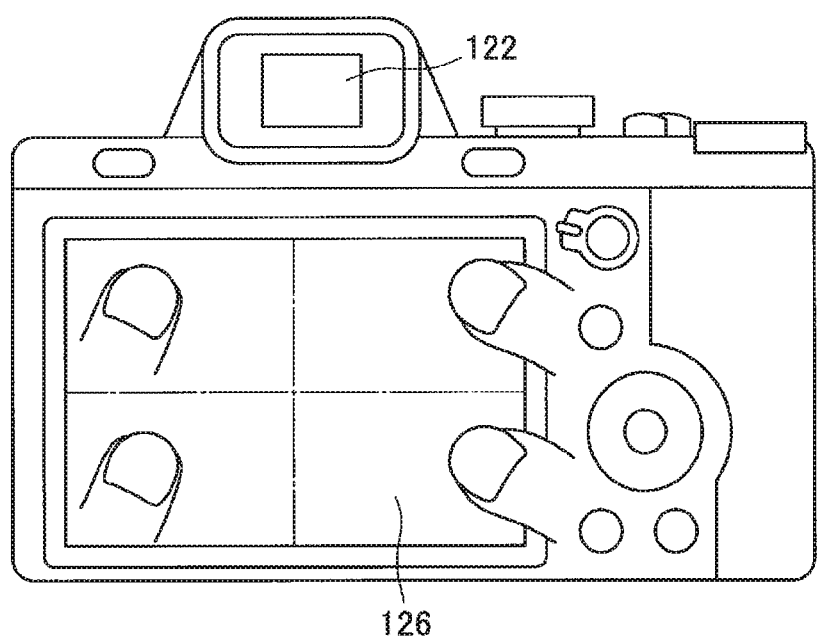
FIG. 7 is an explanatory view illustrating an example in which the operation display portion 126 is divided into four regions according to the embodiment.

Alternatively, the touch state can also be distinguished in accordance with the touch position of the user with respect to the operation display portion 126. For example, the touch state may be distinguished by which region the touch position of the user is in, among a plurality of regions set in advance in the operation display portion 126. For example, in the example illustrated in FIG. 7, the operation display portion 126 is divided into four regions, and the touch state can be distinguished by which region, among these four regions, the touch position of the user is in.

Figure 8A:
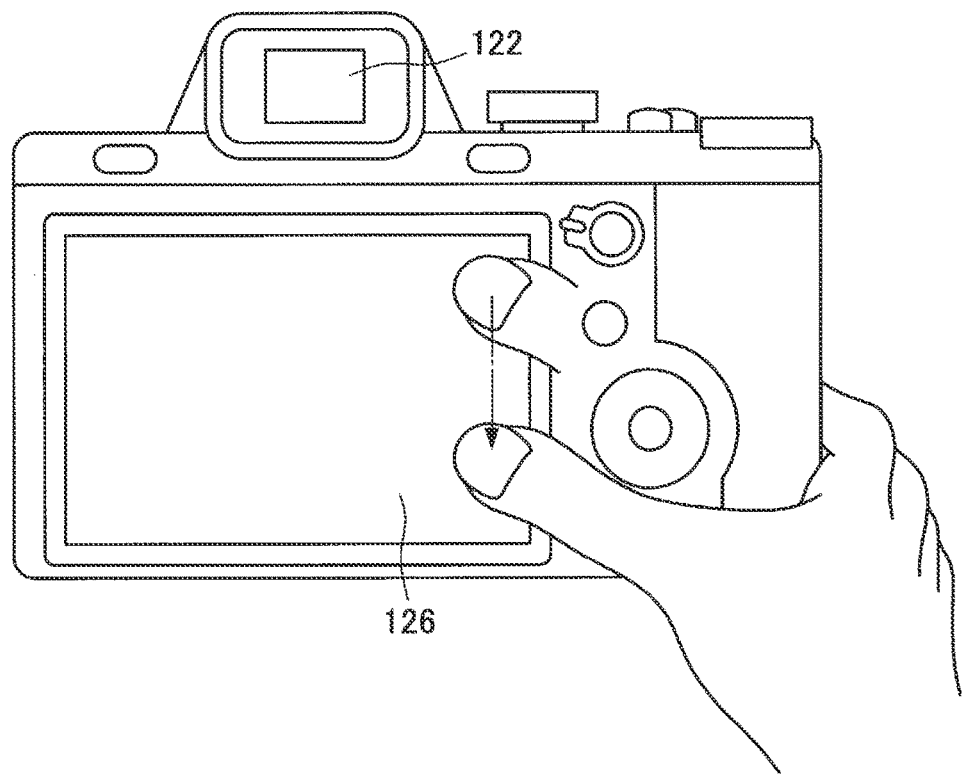
FIGS. 8(A) and 8(B) are explanatory views illustrating an example of a touch gesture by a user with respect to the operation display portion 126 according to the embodiment.
Figure 8B:
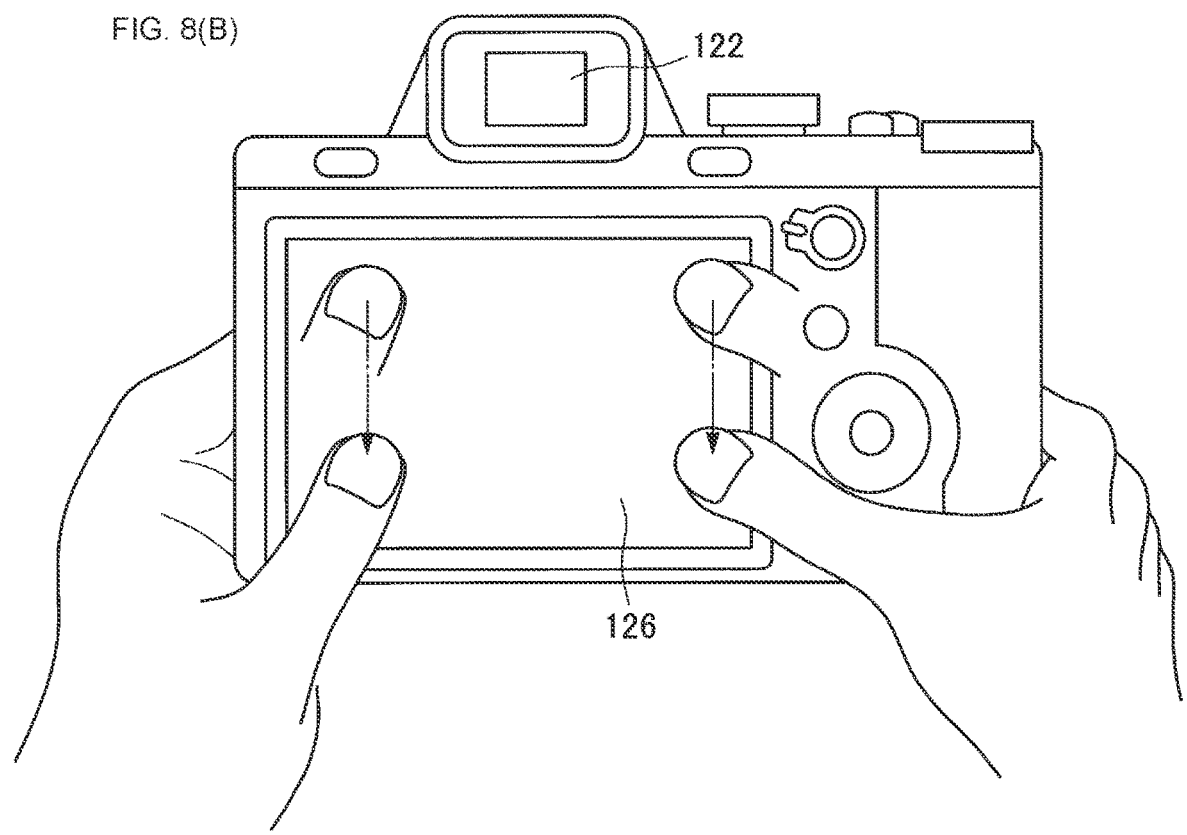

Alternatively, the touch state can be distinguished by a gesture operation with respect to the operation display portion 126. For example, the touch state can be distinguished by the type of gesture operation with respect to the operation display portion 126, or may be distinguished by whether there is a gesture operation with respect to the operation display portion 126. Here, a gesture operation includes, for example, a drag operation, a flick, a swipe, a pinch, or a tap or the like, with respect to the operation display portion 126. Also, the type of gesture operation may further be distinguished by the length of time for which the operation is continuing (e.g., a long press), the number of operations, or the amount of force of the touch. Also, the type of gesture operation can be further distinguished by the number of fingers used for the operation. For example, an operation in which the operation display portion 126 is swiped from up to down with only the thumb of the right hand (FIG. 8(A)) and an operation in which the operation display portion 126 is swiped from up to down with the thumbs of both hands (FIG. 8(B)), as illustrated in FIGS. 8(A) and 8(B), are distinguished as different types of operations.

(2-1-2-1. Association Examples)

Here, one example of an association by the association unit 102 will be described. For example, a process related to shooting can be associated with a case where an eye is close to the EVF 122. For example, a process that changes shooting parameters may be associated with a case where an eye is close to the EVF 122. Here, the process that changes shooting parameters is, for example, executing an ND filter, activating or switching a low pass filter, activating an auto HDR function, a process of switching between autofocus and manual focus, changing the shutter speed, adjusting the aperture, changing the ISO sensitivity, or adjusting the white balance. Alternatively, a process that causes the EVF 122 to display a histogram may be associated with this case.

Alternatively, a process that causes the EVF 122 to display a guide display for determining the composition may be associated with a case where an eye is close to the EVF 122. Here, the guide display is, for example, gridlines or a level or the like. According to these association examples, the user is able to more easily determine the composition when looking through the EVF 122.

Alternatively, a process that causes a change in the manner in which the focus region is displayed may be associated with a case where an eye is close to the EVF 122. For example, activation of a peaking function (that is, displaying the focus region emphasized with a specific color or the like), or magnifying the focus region or the like, may be associated with this case. According to these association examples, a user is able to more easily bring the camera into focus when using manual focus (or autofocus).

Alternatively, a process that causes the EVF 122 to display setting information related to an aperture preview (i.e., displaying an image shot with a set aperture value before shooting), or shooting, may be associated with a case where an eye is close to the EVF 122. Here, the set information related to shooting includes, for example, information such as whether autoflash is set, setting information related to a self-timer, whether autofocus is set, or whether a facial recognition function is set or the like. According to these association examples, the user is able to check setting information related to shooting, without performing a special operation, even in a case where the user is looking through the EVF 122.

Alternatively, a process that preview-displays a shot image in the EVF 122 immediately after shooting may be associated with a case where an eye is close to the EVF 122.

Also, a process related to shooting can be associated with a case where an eye is not close to the EVF 122. For example, a process that causes the operation display portion 126 to display setting information related to shooting, a process that preview-displays the shot image in the operation display portion 126, or live view shooting (i.e., shooting without the user looking through the EVF 122), or the like, may be associated with a case where the user is not looking through the EVF 122.

Alternatively, a process related to playing back an image can be associated with a case where an eye is not close to the EVF 122. For example, a process that causes the operation display portion 126 to display one image, execution of a rating with respect to an image being played back, a process that deletes an image being played back, or a process that transfers a shot image to another device such as a smartphone, for example, or the like, may be associated with a case in which the user is not looking through the EVF 122.

Alternatively, a process that turns the screen of the operation display portion 126 off may be associated with a case where an eye is not close to the EVF 122. According to this association example, power consumption can be suppressed in cases such as when the user stops using the shooting device 10-1, for example. Also, it is no longer necessary for the user to perform a special operation to turn the screen off.

Alternatively, regarding a case where a predetermined operation with respect to the operation display portion 126 is performed, a predetermined process is associated with a case where an eye is not close to the EVF 122, but it is also possible not to have (any) process be associated with a case in which an eye is close to the EVF 122. This association example will be described later with reference to FIG. 9.

Alternatively, the same process may be associated, regardless of whether an eye is close to the EVF 122, with a case where a predetermined operation with respect to the operation display portion 126 is performed. This association example will be described later with reference to FIG. 11.

Touch Position

Alternatively, a multi-camera control function may be associated with a case where the operation display portion 126 is touched with one of the left and right hands, for example. For example, control over shooting with respect to another shooting device 10-1b, control of the transmission of data such as an image with respect to the other shooting device 10-1b, or a process that causes the operation display portion 126 to display a shot image received from the other shooting device 10-1b may be associated with a case where the operation display portion 126 is touched with one of the left and right hands.

Gesture Operation

Alternatively, a process that deletes an image being played back may be associated with an operation of swiping the operation display portion 126 from up to down with only the right hand, as illustrated in FIG. 8(A). According to this association example, the user is able to intuitively delete an image. Also, a process that executes rating of an image being played back may be associated with an operation of swiping the operation display portion 126 from up to down with both hands, as illustrated in FIG. 8(B). Note that this rating may be rating in which a higher score is given as the distance of the swipe on the operation display portion 126 increases.

Alternatively, a process that magnifies and displays the focus region may be associated with a case where an upper position on the operation display portion 126 is long pressed, and a process that reduces and displays the focus region may be associated with a case where a lower position on the operation display portion 126 is long pressed, respectively. Alternatively, a process that magnifies and displays the focus region may be associated with a case where a long press is performed on the operation display portion 126, and the magnification factor of the focus region may be set to change in accordance with the touch position. For example, the magnification factor of the focus region may be set to a larger value as the touch position becomes higher.

Alternatively, a process that causes the operation display portion 126 to display a histogram, or a process that magnifies and displays a region near the touch position with respect to the operation display portion 126, may be associated with a case where the user long presses the operation display portion 126.

Alternatively, a process that ends the display of peaking (or gridlines or the like) in accordance with the duration of a long press may be associated with a case where the user long presses the operation display portion 126. For example, peaking (or gridlines or the like) may be set to be displayed in a case where the duration of a long press is within a predetermined period of time, and peaking (or gridlines or the like) may be set to be automatically hidden in a case where the duration of a long press exceeds the predetermined period of time. According to this setting example, the user is able to hide peaking without needing to perform a special operation, e.g., moving a hand, in order to hide peaking that has been temporarily displayed.

(2-1-2-2. Storing Association Relationships)

Also, the association unit 102 is able to store the associated results in the storage unit 128. For example, the association unit 102 stores, in the storage unit 128, all pairs of combinations of whether an eye is close to the EVF 122 and the touch state with respect to the operation display portion 126, and identification information of the associated process.

[2-1-3. Detection Result Acquisition Unit 104]

The detection result acquisition unit 104 acquires, from the detection portion 124, information as to whether an eye is close to the EVF 122, that has been detected by the detection portion 124. Also, the detection result acquisition unit 104 acquires, from the operation display portion 126, the detection result of the touch state with respect to the operation display portion 126.

[2-1-4. Process Control Unit 106]

The process control unit 106 executes the process associated with the detection result of whether an eye is close to the EVF 122, and the detection result of the touch state with respect to the operation display portion 126, which have been acquired by the detection result acquisition unit 104. For example, the process control unit 106 first extracts, from the storage unit 128, identification information of the process that is associated with the detection result of whether an eye is close to the EVF 122 and the detected touch state, and that is stored in the storage unit 128. Then, the process control unit 106 executes the process indicated by the extracted identification information.

Further, the process control unit 106 is also able to change the setting mode of the operation display portion 126 depending on whether an eye is close to the EVF 122. For example, in a case where an eye is close to the EVF 122, the process control unit 106 sets the operation display portion 126 to touch panel mode. In this touch panel mode, the screen is displayed on the operation display portion 126, and position designation by the touch operation is designation by an absolute position. Also, in a case where an eye is not close to the EVF 122, the process control unit 106 sets the operation display portion 126 to touch pad mode. In this touch pad mode, basically the screen on the operation display portion 126 is turned off, and the position designation by the touch operation is designation by an absolute position. Note that as a modified example, the screen may also be displayed on the operation display portion 126 in the touch pad mode.

[2-1-5. Imaging Portion 120]

The imaging portion 120 shoots an image by forming an outside image on a pickup device such as a charge coupled device (CCD) or a complementary metal oxide semiconductor (CMOS), for example, through a lens.

[2-1-6. Detection Portion 124]

The detection portion 124 detects the usage state and the like of the shooting device 10-1 by the user. For example, the detection portion 124 detects whether an eye is close to the EVF 122, using infrared or the like. As an example, the detection portion 124 determines that an eye is close to the EVF 122 in a case where an object is detected close to the EVF 122 by an infrared sensor. That is, the detection portion 124 does not need to determine whether the object (that is close to the EVF 122) is an eye.

[2-1-7. Storage Unit 128]

The storage unit 128 stores various kinds of data and various kinds of software. For example, the storage unit 128 stores information indicating the association results from the association unit 102.

Note that the configuration of the shooting device 10-1 according to the present embodiment is not limited to the configuration described above. For example, the detection portion 124 does not have to be included in the shooting device 10-1 in a case where the EVF 122 itself (instead of the detection portion 124) can detect whether an eye is close to the EVF 122.

<2-2. Application Examples>

Heretofore, the configuration according to the present embodiment has been described. Next, application examples according to the present embodiment will be described in "2-2-1. Application example 1" to "2-2-3. Application example 3." Note that in the description below, a process association example in a case where the touch state is divided into four types of whether each of two hands of the user is touching the operation display portion 126, will be described. Also, the association example described below is merely an example. The association is not limited to this example. Any association is possible.

[2-2-1. Application Example 1]

First, an application example 1 will be described in detail with reference to FIG. 9. This application example 1 is an example of a case where a process is associated with each state, with an emphasis on checking the focus region and checking an image being played back.

Figure 9:
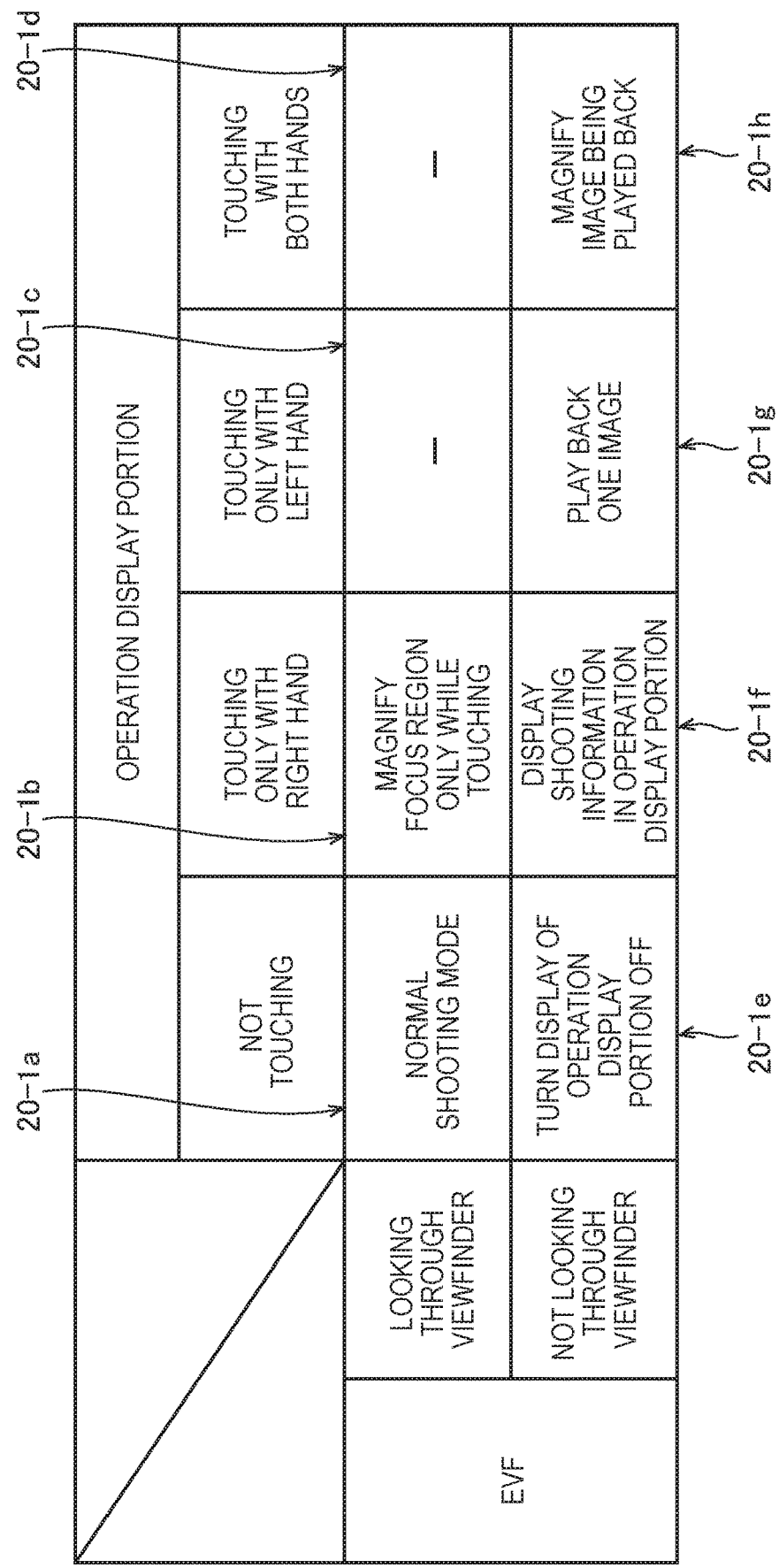
FIG. 9 is an explanatory view illustrating an example of process association according to an application example 1 of the embodiment.

For example, with regard to a case where the user is looking through the EVF 122, a "normal shooting mode" is associated with a case where the user is not touching the operation display portion 126 at all, and a "process that magnifies and displays the focus region only while the operation display portion 126 is being touched" is associated with a case where the user is touching the operation display portion 126 only with his or her right hand, as illustrated in FIG. 9.

Also, with regard to a case where the user is not looking through the EVF 122, a "process that turns off the screen of the operation display portion 126" is associated with a case where the user is not touching the operation display portion 126 at all, and a "process that causes the operation display portion 126 to display setting information related to shooting" is associated with a case where the user is touching the operation display portion 126 with only his or her right hand, and a "process that plays back one image" is associated with a case where the user is touching the operation display portion 126 with only his or her left hand, and "a process that magnifies and displays an image being played back" is associated with a case where the user is touching the operation display portion 126 with both hands.

According to this application example 1, the user is able to easy perform an operation related to checking the focus region when shooting, and an operation related to checking an image being played back. For example, in a case where the user is looking through the EVF 122, the focus region is able to be magnified and displayed simply by touching the operation display portion 126 with the right hand. Also, in a case where the user is not looking through the EVF 122, an image being played back is able to be magnified and displayed simply by touching the operation display portion 126 with both hands.

Note that in the example illustrated in FIG. 9, a process is not associated with state 20-1c and state 20-1d. The reason for this is because of the situation as described below. Normally, in the case where the user is looking through the EVF 122, the left hand is positioned holding the shooting lens. Therefore, it is difficult for the user to touch the operation display portion 126 with his or her left hand without changing his or her grip. However, the present disclosure is not limited to this example. Some process can also be associated with the state 20-1c or the state 20-1d.

[2-2-2. Application Example 2]

Next, an application example 2 will be described in detail with reference to FIG. 10. This application example 2 is an example in which all processes related to playback are associated with a case in which the user is not looking through the EVF 122. Note that, with regard to the case where the user is looking through the EVF 122, the associations are similar to the associations of application example 1 (illustrated in FIG. 9), for example, as illustrated in FIG. 10.

Figure 10:
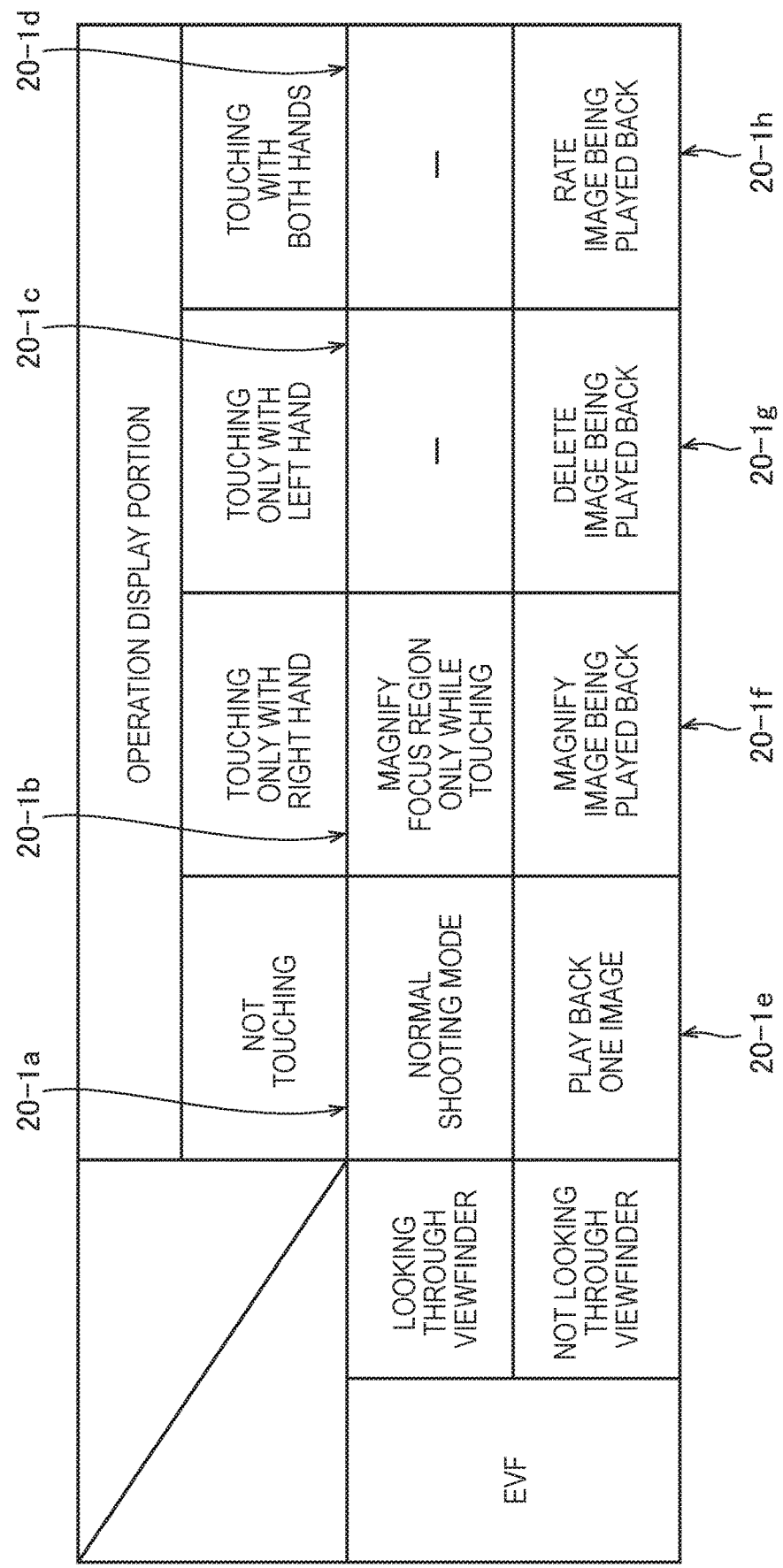
FIG. 10 is an explanatory view illustrating an example of process association according to an application example 2 of the embodiment.

Also, with regard to the case where the user is not looking through the EVF 122, a "process that plays back one image" is associated with a case where the user is not touching the operation display portion 126 at all, and a "process that magnifies and displays an image being played back" is associated with a case where the user is touching the operation display portion 126 only with his or her right hand, as illustrated in FIG. 10. The reason for this is that first, in a case where the user is not touching the operation display portion 126 at all, it is effective to display the entire image (because the operation display portion 126 is not being hidden by the user's hand). Second, in a case where the user is touching the operation display portion 126 with only one hand, a portion of the operation display portion 126 ends up being hidden by the user's hand, so it is effective to display only a portion of the entire image the entire image centrally.

Also, a "process that deletes an image being played back" is associated with a case where the user is touching the operation display portion 126 with only his or her left hand, and a "process that executes rating of an image being played back" is associated with a case where the user is touching the operation display portion 126 with both hands.

In this application example 2, all of the processes related to playback are associated with the case where the user is not looking through the EVF 122. Therefore, the user is able to easily perform many types of processes related to playback, such as playing back, magnifying and displaying, or rating an image, for example.

[2-2-3. Application Example 3]

Next, an application example 3 will be described in detail with reference to FIG. 11. This application example 3 is an example in which a process that preview displays a shot image is associated with a case where the operation display portion 126 is being touched with one hand (the right hand), regardless of whether an eye is close to the EVF 122.

Figure 11:
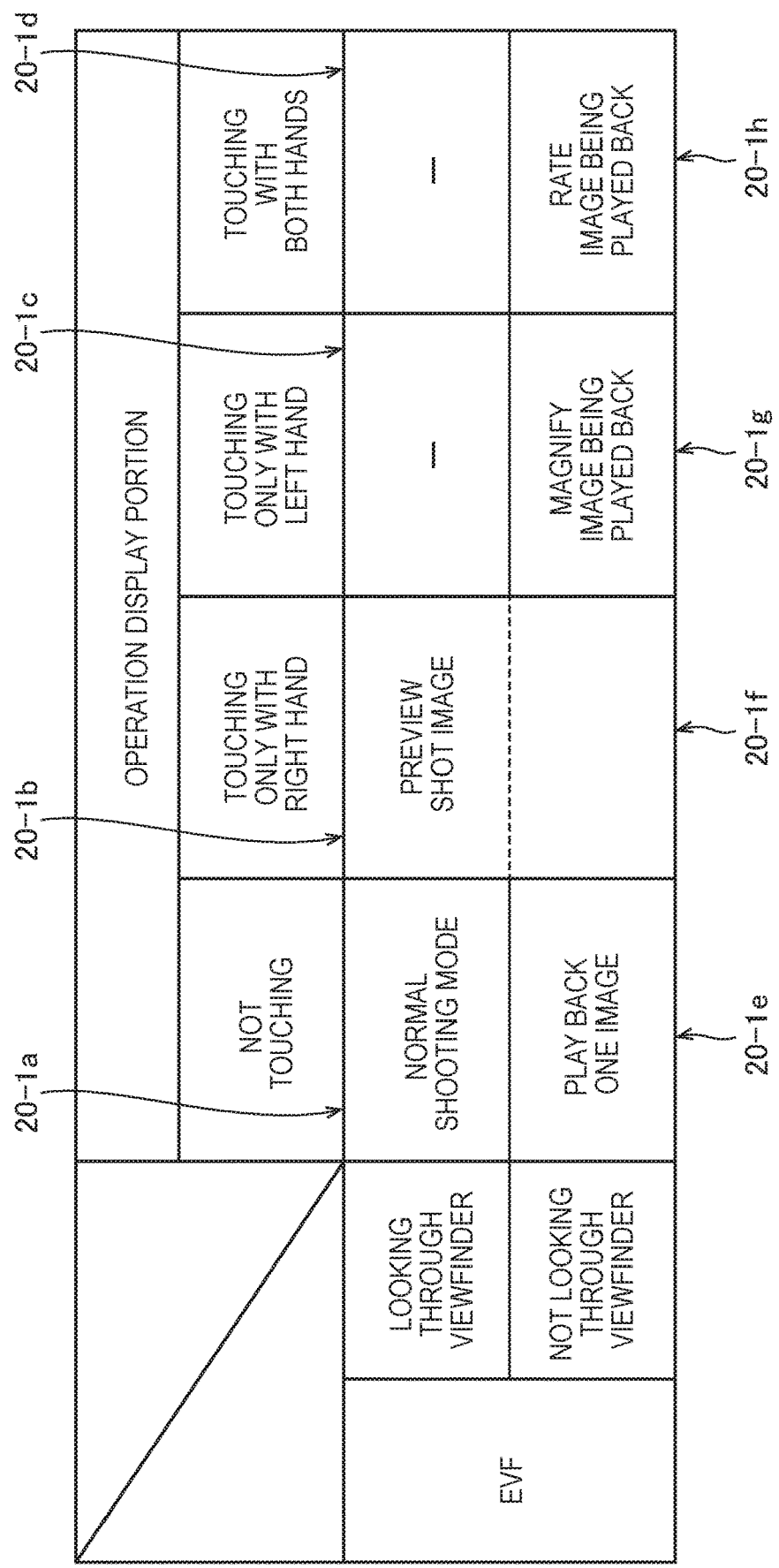
FIG. 11 is an explanatory view illustrating an example of process association according to an application example 3 of the embodiment.

For example, with regard to the case where the user is looking through the EVF 122, the "normal shooting mode" is associated with a case where the user is not touching the operation display portion 126 at all, and a "process that preview displays a shot image" is associated with a case where the user is touching the operation display portion 126 only with his or her right hand, as illustrated in FIG. 11.

Also, with regard to a case where the user is not looking through the EVF 122, a process that "plays back one image" is associated with a case where the user is not touching the operation display portion 126 at all, and a "process that preview displays a shot image" is associated with a case where the user is touching the operation display portion 126 with only his or her right hand, and a "process that magnifies and displays an image being played back" is associated with a case where the user is touching the operation display portion 126 with only his or her left hand, and "a process that executes rating of an image being played back" is associated with a case where the user is touching the operation display portion 126 with both hands.

According to this application example 3, the user is able to quickly and easily check the shot image. Also, in a case where the user feels that an image was well shot, it is possible to easily magnify and display the image, and execute rating.

[2-2-4. Modified Examples]

Note that the application example 1 to the application example 3 are not limited to examples that are applied separately, and may also be combined as appropriate. For example, in the example illustrated in FIG. 9, an example is given in which a "process that causes the operation display portion 126 to display setting information related to shooting" is associated with state 20-1f, but instead of this example, the "process that preview displays a shot image" may be associated with the state 20-1f. Also, with regard to the individual states 20-1 in the application example 1 to the application example 3 described above, the type of process that is associated can also be changed as appropriate.

Also, the information of the association relationships in the application example 1 to the application example 3 described above may be pre-installed in the shooting device 10-1. Also, the user can also select, as appropriate, any one of the three types of application examples.

<2-3. Operation>

Figure 12:
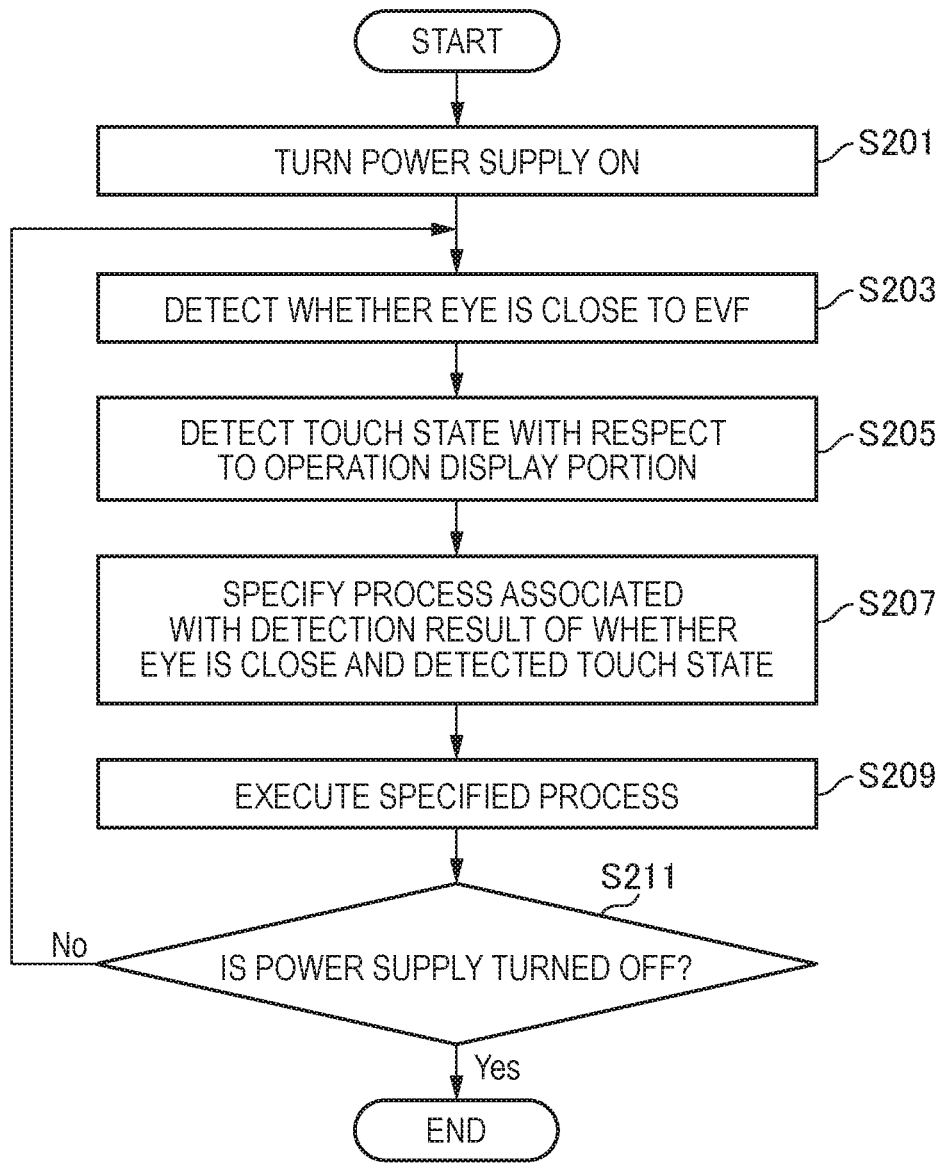
FIG. 12 is flowchart illustrating operation according to the embodiment.

Heretofore, application examples according to the present embodiment have been described. Next, the operation according to the present embodiment will be described with reference to FIG. 12. As illustrated in FIG. 12, first, the user turns ON a power supply of the shooting device 10-1 by pressing a power supply button, for example (S201).

Then, the detection portion 124 detects whether an eye is close to the EVF 122. Also, the detection result acquisition unit 104 acquires the detection result from the detection portion 124 (S203).

Further, the operation display portion 126 detects the touch state with respect to the operation display portion 126. Then, the detection result acquisition unit 104 acquires the detection result from the operation display portion 126 (S205).

Then, the process control unit 106 extracts identification information of the process that is associated with the combination of the detection result of whether an eye is close to the EVF 122 acquired in S203 and the detection result of the touch state acquired in S205, and that is stored in the storage unit 128 (S207). Then, the process control unit 106 executes the process indicated by the extracted identification information (S209).

Then, this operation ends if the power supply is turned OFF (S211: Yes) due to the power supply button being pressed or the like by the user, for example. However, if the power supply remains ON (S211: No), the shooting device 10-1 performs S203 and thereafter again.

<2-4. Effects>

As described above, the shooting device 10-1 according to the present embodiment executes a process associated in advance with a combination of the detection result of whether an eye is close to the EVF 122, and the detection result of the touch state with respect to the operation display portion 126. Therefore, each user is able to easily perform operations related to shooting and playback, by associating each process suitable for the user with each combination of whether an eye is close to the EVF 122 and the touch state with respect to the operation display portion 126.

For example, when the workflow illustrated in FIG. 2 and FIG. 3 is performed, the user does not need to perform the operation of pressing a different button for each step. Therefore, the user is able to perform the workflow smoothly without changing his or her grip. Also, because the operation display portion 126 is basically arranged in a position that is easy to touch when the user is holding the shooting device 10-1, the operation display portion 126 can be operated easily compared with a well-known digital camera. For example, the user is able to smoothly magnify and display the focus region when shooting, preview a shot image, magnify and display an image being played back, or rate an image being played back, or the like.

<<3. Practical Use Examples>>

Next, practical use examples will be described in "3-1. Practical use example 1" to "3-2. Practical use example 2." Note that description of content that overlaps with the embodiment described above will be omitted below.

<3-1. Practical Use Example 1>

Figure 13:
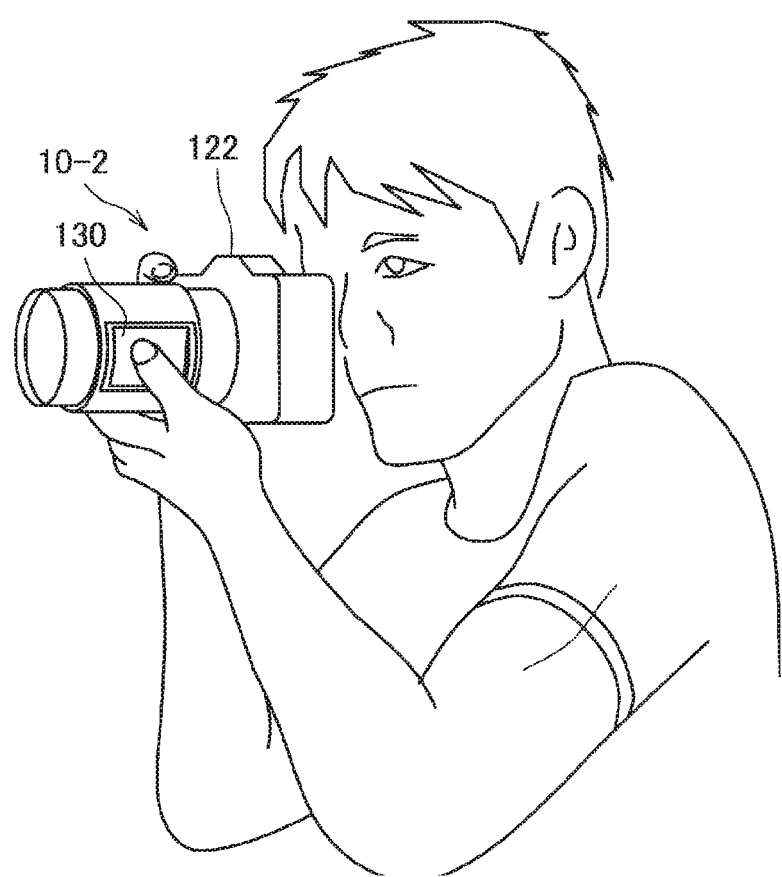
FIG. 13 is an explanatory view illustrating a user operating a touch operation portion 130 according to a practical use example 1 of the embodiment.

First, a practical use example 1 will be described. FIG. 13 is an explanatory view illustrating part of the external appearance of a shooting device 10-2 according to the practical use example 1. In the shooting device 10-2 according to the practical use example 1, a touch operation portion 130 is arranged in a predetermined position on an outer peripheral portion of a shooting lens, for example, as illustrated in FIG. 13. For example, the touch operation portion 130 can be arranged on a lower portion of the outer periphery of the shooting lens.

As will be described later, the shooting device 10-2 according to the practical use example 1 is able to execute a process associated in advance with a combination of whether an eye is close to the EVF 122, and the touch state with respect to the operation display portion 126, and the touch state with respect to the touch operation portion 130.

[3-1-1. Configuration]

Figure 14:
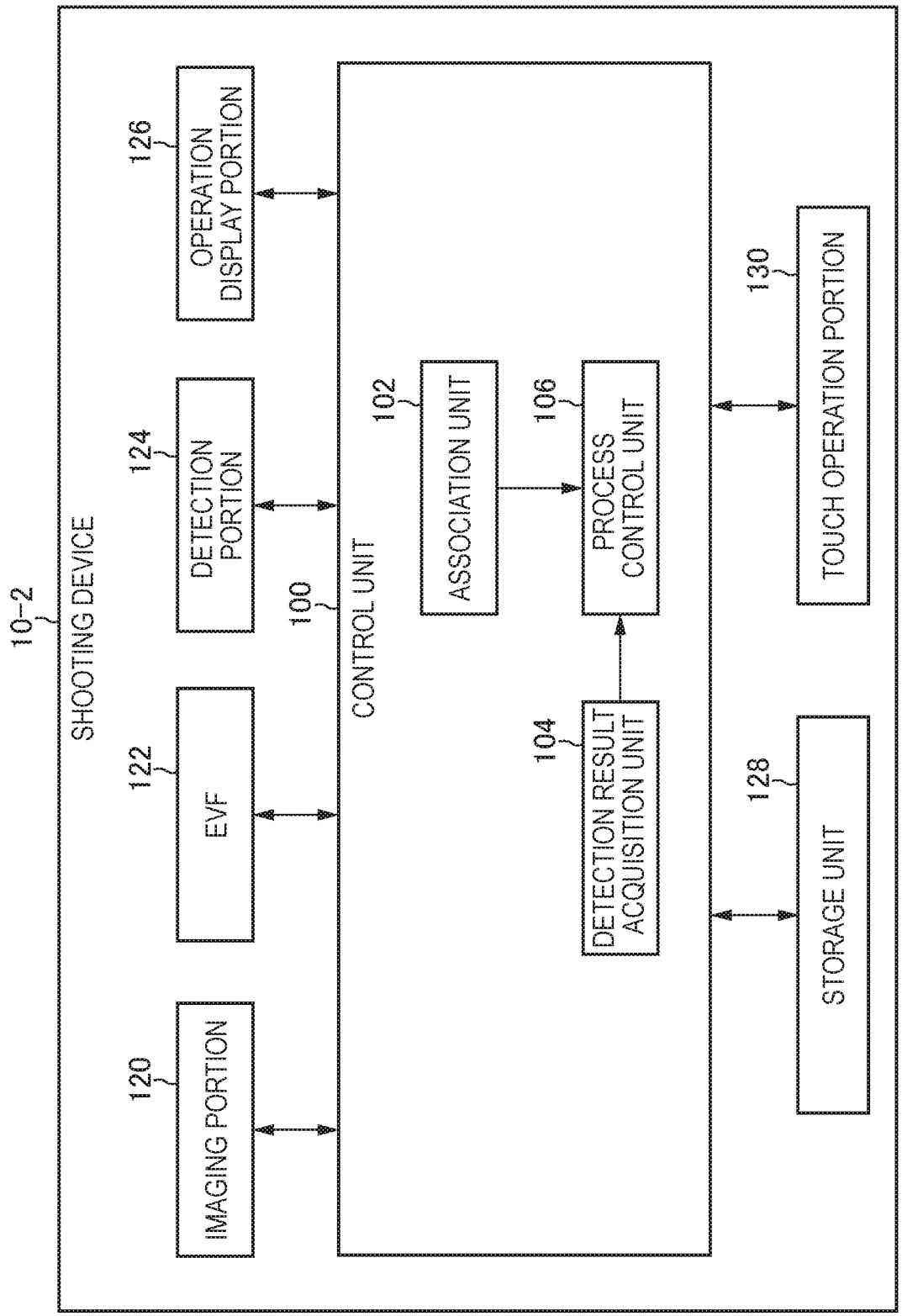
FIG. 14 is a functional block diagram illustrating the internal configuration of a shooting device 10-2 according to the practical use example 1.

FIG. 14 is a functional block diagram illustrating the configuration of the shooting device 10-2 according to the practical use example 1. Compared to the shooting device 10-1 illustrated in FIG. 4, the shooting device 10-2 further includes the touch operation portion 130, as illustrated in FIG. 14.

The touch operation portion 130 is an operation portion that detects a touch operation by the user. Note that, as a modified example, the touch operation portion 130 may have the function of a display portion that displays various types of information, e.g., a touch panel.

The association unit 102 according to the practical use example 1 associates a combination of whether an eye is close to the EVF 122, the touch state with respect to the operation display portion 126, and the touch state with respect to the touch operation portion 130, with a predetermined process related to shooting or playback of an image, on the basis of input by the user, for example.

The process control unit 106 according to the practical use example 1 executes a process associated with a combination of the detection result of whether an eye is close to the EVF 122, the detection result of the touch state with respect to the operation display portion 126, and the detection result of the touch state with respect to the touch operation portion 130, which have been acquired by the detection result acquisition unit 104.

[3-1-2. Application Example]

Heretofore, the configuration according to the practical use example 1 has been described. Next, an application example of the practical use example 1 will be described with reference to FIG. 15.

Figure 15:
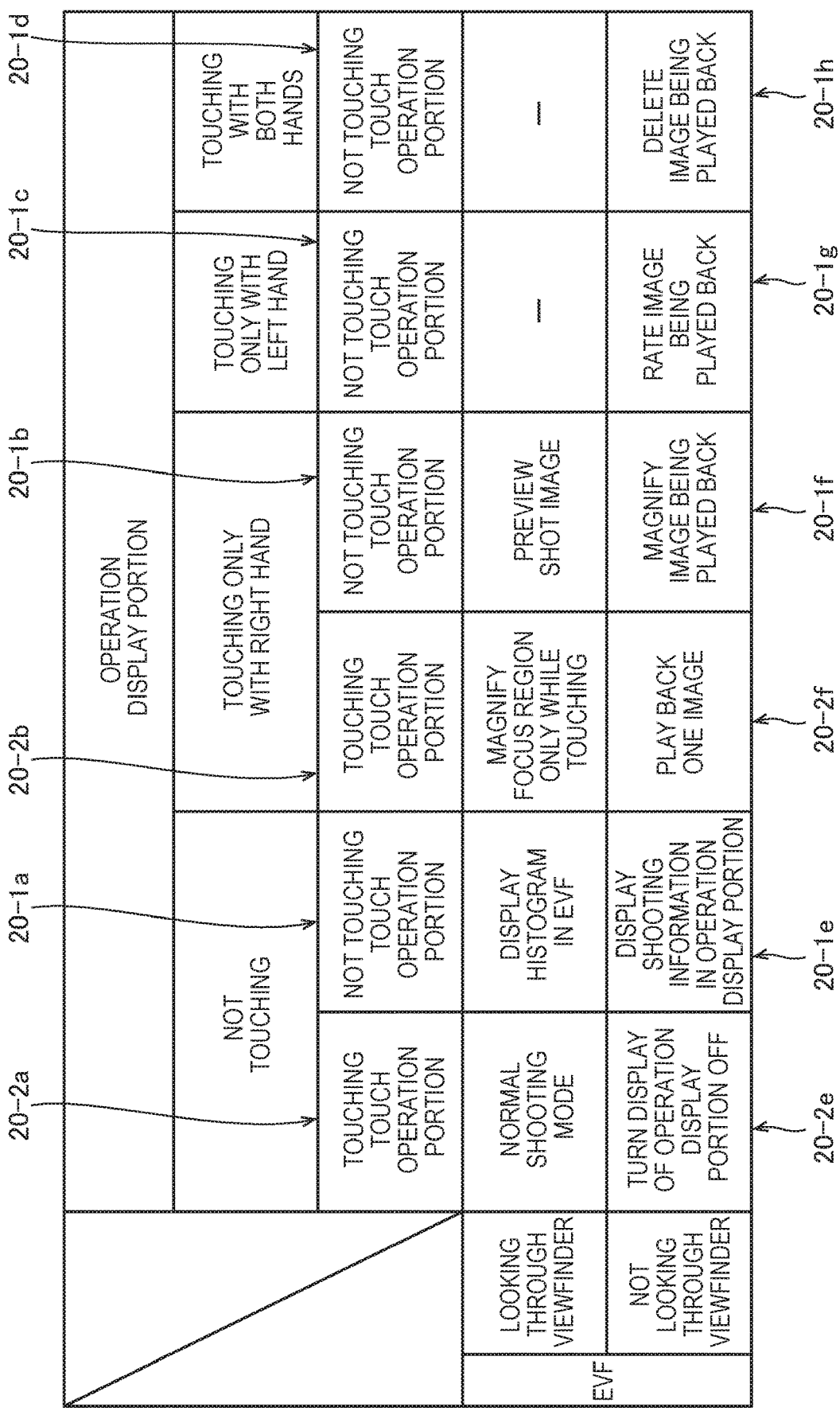
FIG. 15 is an explanatory view illustrating an example of process association according to the practical use example 1.

As illustrated in FIG. 15, with regard to a case where the user is not touching the operation display portion 126 at all, and a case where the user is touching the operation display portion 126 with only his or her right hand, the state is further divided in accordance with whether the user is touching the touch operation portion 130. Therefore, compared to the application examples according to the present embodiment, illustrated in FIG. 9 to FIG. 11, four other states (i.e., states 20-2 in which the user is touching the touch operation portion 130) are added.

According to this application example, the total number of states with which processes can be associated can be increased, compared to the embodiment described above. Therefore, the user can execute even more types of processes by an easy operation.

<3-2. Practical Use Example 2>

Figure 16A:
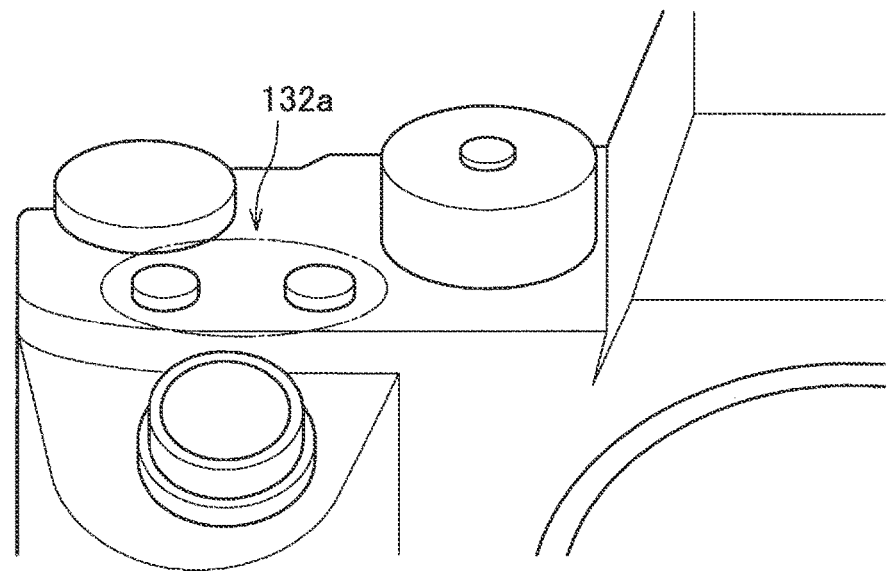
FIGS. 16(A) and 16(B) are explanatory views illustrating an example of the external appearance of a shooting device 10-3 according to a practical use example 2 of the embodiment.
Figure 16B:
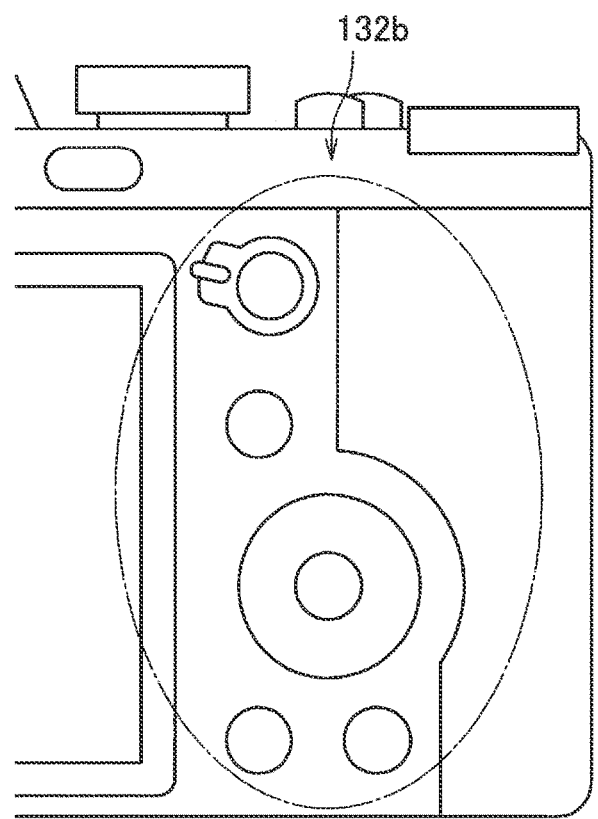

Next, an application example 2 will be described. FIGS. 16(A) and 16(B) are explanatory views illustrating part of the external appearance of a shooting device 10-3 according to the practical use example 2. As illustrated in FIGS. 16(A) and 16(B), the shooting device 10-3 according to the practical use example 2 has a plurality of operation buttons 132 on the case. These operation buttons 132 are arranged in positions where the user is able to press the buttons while touching the operation display portion 126, for example. For example, in the example illustrated in FIG. 16(A), the user is able to press operation buttons 132a with the index finger of his or her right hand, while touching the operation display portion 126 with the thumb of his or her right hand. Also, in the example illustrated in FIG. 16(B), the user is able to depress operation buttons 132b with a finger of his or her right hand, while (gripping the shooting device 10-3 with the left hand, and) touching the operation display portion 126 with his or her left hand.

As will be described later, the shooting device 10-3 according to the practical use example 2 is able to execute a process associated in advance with a combination of whether an eye is close to the EVF 122, the touch state with respect to the operation display portion 126, and the depression state of the operation buttons 132.

[3-2-1. Configuration]

Figure 17:
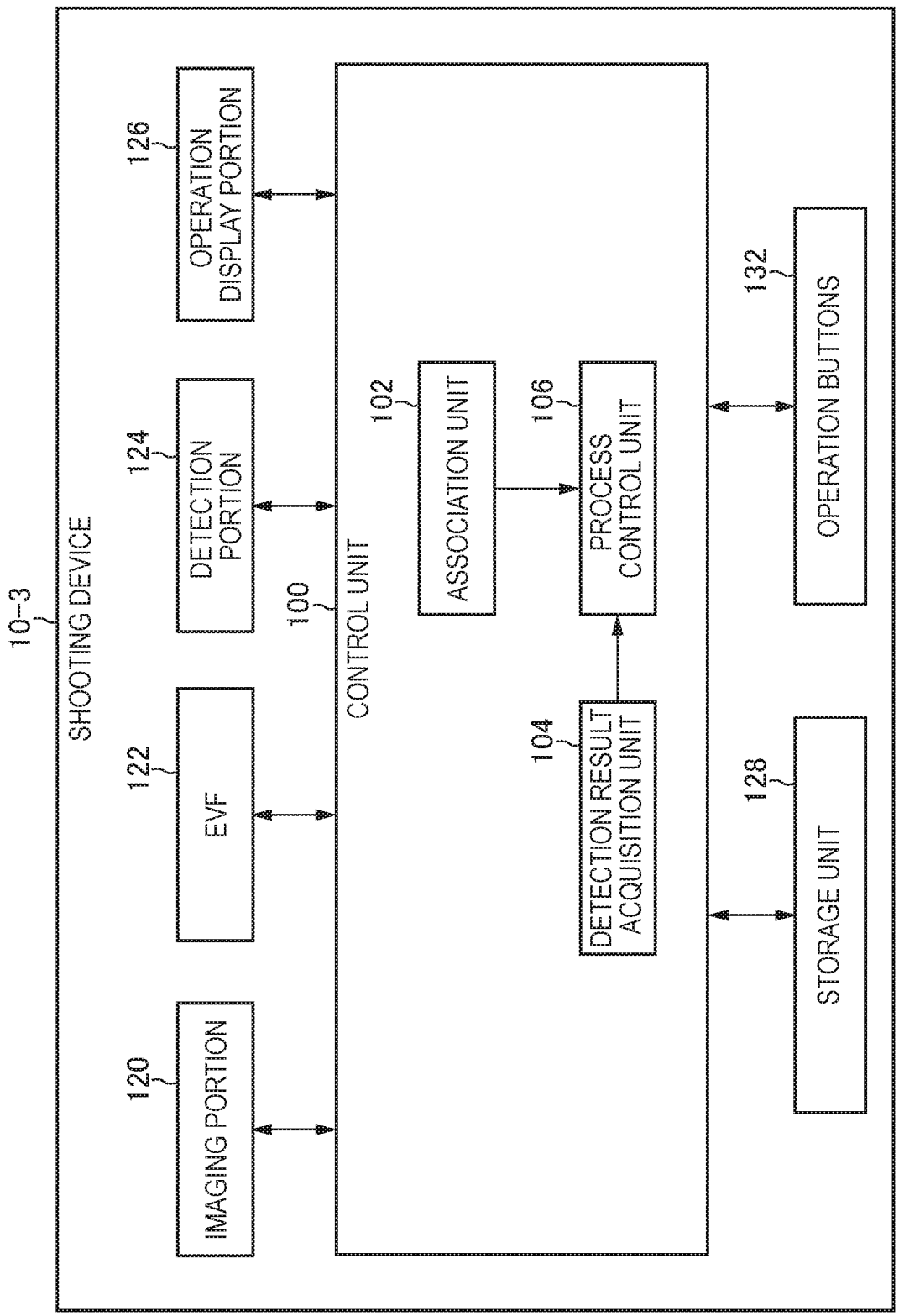
FIG. 17 is a functional block diagram illustrating the internal configuration of the shooting device 10-3 according to the practical use example 2.

FIG. 17 is a functional block diagram illustrating the configuration of the shooting device 10-3 according to the practical use example 2. Compared to the shooting device 10-1 illustrated in FIG. 4, the shooting device 10-3 further includes the operation buttons 132, as illustrated in FIG. 17.

The association unit 102 according to the practical use example 2 associates a combination of whether an eye is close to the EVF 122, the touch state with respect to the operation display portion 126, and whether the operation buttons 132 are being depressed, with a predetermined process related to shooting or playback of an image, on the basis of input by the user, for example.

The process control unit 106 according to the practical use example 2 executes a process associated with a combination of the detection result of whether an eye is close to the EVF 122, the detection result of the touch state with respect to the operation display portion 126, and the detection result of depression of the operation buttons 132, which have been acquired by the detection result acquisition unit 104. For example, the process control unit 106 executes a process associated with the detection result of depression of the operation buttons 132 when the user is touching the operation display portion 126.

[3-2-2. Application Example]

Heretofore, the configuration according to the practical use example 2 has been described. Next, an application example of the practical use example 2 will be described with reference to FIG. 18.

Figure 18:
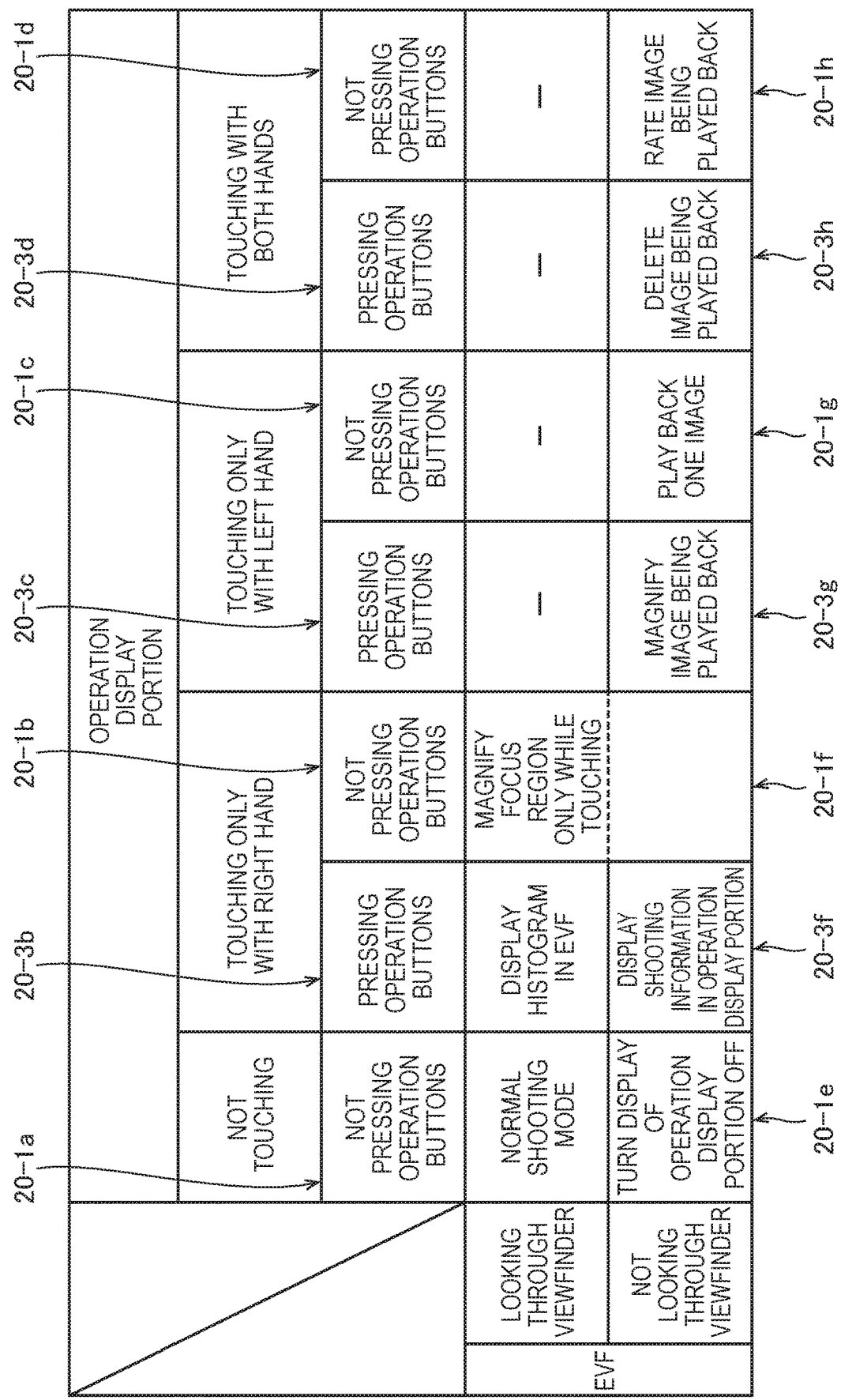
FIG. 18 is an explanatory view illustrating an example of process association according to the practical use example 2.

As illustrated in FIG. 18, with regard to a case where the user is touching the operation display portion 126 with only his or her right hand, a case where the user is touching the operation display portion 126 with only his or her left hand, and a case where the user is touching the operation display portion 126 with both hands, the state is further divided in accordance with whether the user is depressing the operation buttons 132. Therefore, compared to the application examples according to the present embodiment, illustrated in FIG. 9 to FIG. 11, six other states (i.e., states 20-3 in which the user is depressing the operation buttons 132) are added.

According to this application example, the total number of states with which processes can be associated can be increased, compared to the embodiment described above. Therefore, the user can execute even more types of processes by an easy operation.

<3-3. Modified Examples>

Note that the practical use examples of the present embodiment are not limited to the practical use example 1 and the practical use example 2 described above. For example, the detection results from a grip sensor or a touch sensor that can be arranged on the shooting device 10-1 may be used instead of the touch state with respect to the touch operation portion 130 (practical use example 1) or the depression state of the operation buttons 132 (practical use example 2). Alternatively, the touch state or the depression state with respect to a button or a focus ring of the shooting lens may be used.

Also, the process control unit 106 is able to execute a process associated with the detection results of these sensors or the detection result of the touch state or the depression state with respect to these portions. For example, the process control unit 106 may turn the screen of the operation display portion 126 off in a case where it has been detected by a grip sensor that the user has removed his or her hand from the shooting device 10-1.

<<4. Modified Examples>>

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

<4-1. Modified Example 1>

[4-1-1. Configuration]

For example, in the embodiment described above, an application example related to shooting or playback using the shooting device 10-1 to the shooting device 10-3 is described, but the present disclosure is not limited to this example. For example, the present disclosure may also be applied to a situation in which a television is remotely controlled using a mobile terminal. FIG. 19 is an explanatory view illustrating a configuration example of a control system according to this modified example 1. As illustrated in FIG. 19, the control system according to the modified example 1 includes a television 30, a camera 32, and a mobile terminal 40.

The camera 32 is arranged on the television 30, and shoots an image of an area in front of the television 30. For example, the television 30 or the mobile terminal 40 can determine whether a person in front of the television 30 is looking at the television 30, on the basis of the shooting result from the camera 32.

The mobile terminal 40 is a mobile type terminal having a touch display. For example, the mobile terminal 40 may be a smartphone or a tablet terminal or the like.

For example, in a case where it is detected that the user is looking at the television 30 and is touching the touch display of the mobile terminal 40, the mobile terminal 40 does not display an operation screen on the touch display (that is, is set to touch pad mode).

Also, in a case where it is detected that the user is looking at the touch display of the mobile terminal 40, the mobile terminal 40 displays the operation screen on the touch display (that is, is set to touch panel mode). Note that the determination as to whether the user is looking at the touch display of the mobile terminal 40 may be made on the basis of an image shot by a camera arranged in the mobile terminal 40, may be made on the basis of the image shot by the camera 32, or may be made on the basis of these two types of shot images.

[4-1-2. Examples of Gesture Operations]

Note that in the foregoing description, an example in which the method of operation according to the modified example 1 is a touch operation with respect to the mobile terminal 40 is described, but the present disclosure is not limited to this example. For example, the television 30 can be remotely controlled by a gesture in which the mobile terminal 40 itself is moved in the air, as with a pointer device. Note that this gesture at this time may be recognized on the basis of the shooting result from the camera 32, or may be recognized by other technology.

<4-2. Modified Example 2>

Alternatively, the present disclosure is also applicable to medical applications, and the control device of the present disclosure may be a medical device such as a high-tech microscope, for example. For example, the present disclosure is applicable to a situation in which the user operates a touch display as a touch pad, while bringing his or her eye close to a microscope or an endoscope. As an example, the medical device may change the focus, change the zoom, and display setting information related to shooting, in accordance with a touch operation with respect to the touch display.

<4-3. Modified Example 3>

Also, in the embodiment described above, an example in which the control device of the present disclosure is the shooting device 10-1 to the shooting device 10-3 is described, but the control device is not limited to this example. For example, the control device of the present disclosure may be a mobile phone such as a smartphone, a tablet terminal, a PC, or a game console or the like.

Also, according to the embodiment described above, it is also possible to provide a computer program for causing hardware such as a CPU, ROM, and RAM to display a similar function as each of the components of the shooting device 10-1 to the shooting device 10-3 according to the embodiment described above, for example. Further, a storage medium on which the computer program is stored is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control device, including:

a process control unit that executes a process related to shooting or playback of an image, on a basis of whether proximity of an eye with respect to a viewfinder is detected, and detection of an operation state with respect to an operation display portion.

(2)

The control device according to (1), in which the operation state is distinguished by a combination of a number of touch operations performed simultaneously with respect to the operation display portion.

(3)

The control device according to (1) or (2), in which the operation state is distinguished in accordance with a touch position with respect to the operation display portion.

(4)

The control device according to (3), in which the operation state is distinguished by which region the touch position is in, among a plurality of regions set in advance in the operation display portion.

(5)

The control device according to any one of (1) to (4), in which the operation state is further distinguished by a gesture operation with respect to the operation display portion.

(6)

The control device according to (5), in which the gesture operation includes a swiping operation with respect to the operation display portion.

(7)

The control device according to any one of (1) to (6), in which the process control unit executes a process related to shooting in accordance with the operation state, in a case where proximity of an eye with respect to the viewfinder is detected.

(8)

The control device according to (7), in which the process related to shooting is a process that changes a shooting parameter.

(9)

The control device according to (7), in which the process related to shooting is a process that causes the viewfinder to display a guide display for determining composition, or setting information related to shooting.

(10)

The control device according to (7), in which the process related to shooting is a process that causes a change in a manner in which a partial region centered around a position where a subject is in focus is displayed.

(11)

The control device according to (7), in which the process related to shooting is a process that causes the viewfinder to display an image immediately after shooting.

(12)

The control device according to any one of (1) to (11), in which the process control unit controls execution of a process related to shooting in accordance with the operation state, in a case where proximity of an eye with respect to the viewfinder is not detected.

(13)

The control device according to any one of (1) to (11), in which the process control unit controls execution of a process related to playback of an image in accordance with the operation state, in a case where proximity of an eye with respect to the viewfinder is not detected.

(14)

The control device according to any one of (1) to (13), in which the process control unit executes a process related to shooting or playback of an image, in a case where a predetermined operation with respect to the operation display portion is detected and proximity of an eye with respect to the viewfinder is not detected.

(15)

The control device according to (14), in which the process control unit does not execute a process related to shooting or playback of an image, in a case where the predetermined operation with respect to the operation display portion is detected and proximity of an eye with respect to the viewfinder is detected.

(16)

The control device according to any one of (1) to (15), in which when a predetermined operation with respect to the operation display portion is detected, the process control unit executes a same process in a case where proximity of an eye with respect to the viewfinder is not detected and a case where proximity of an eye with respect to the viewfinder is detected.

(17)

The control device according to any one of (1) to (16), in which the process control unit further executes the process related to shooting or playback of an image, on a basis of detection of an operation with respect to a touch operation portion on an outer peripheral portion of a shooting lens.

(18)

The control device according to any one of (1) to (17), in which the process control unit further executes the process related to shooting or playback of an image, on a basis of detection of depression of an operation button provided on a shooting device.

(19)

A control method, including:

executing a process related to shooting or playback of an image, on a basis of whether proximity of an eye with respect to a viewfinder is detected, and detection of an operation state with respect to an operation display portion.

(20)

A program for causing a computer to function as a process control unit that executes a process related to shooting or playback of an image, on a basis of whether proximity of an eye with respect to a viewfinder is detected, and detection of an operation state with respect to an operation display portion.

REFERENCE SIGNS LIST

10-1, 10-2, 10-3 shooting device
30 television
32 camera
40 mobile terminal
100 control unit
102 association unit 104 detection result acquisition unit
106 process control unit
120 imaging portion
122 EVF
124 detection portion
126 operation display portion
128 storage unit
130 touch operation portion
132 operation buttons

The invention claimed is:

1. A control device, comprising:
a process control unit configured to:
execute a first process related to one of a shooting of an image or a playback of the image, wherein the first process is executed based on:
detection of a proximity of an eye with respect to a viewfinder, and
detection of a first operation state of a plurality of operation states on an operation display portion;
control the viewfinder to display a histogram, based on the detection of the proximity of the eye with respect to the viewfinder;
execute a second process related to magnification and display of the playback of the image on the operation display portion, wherein the second process is executed based on:
non-detection of the proximity of the eye with respect to the viewfinder; and
a first touch operation on the operation display portion; and
execute a third process related to magnification and display of a focus region that corresponds to a partial region centered around a position of focus of a subject, wherein
the focus region is displayed in the viewfinder, and
the third process is executed based on:
the detection of the proximity of the eye with respect to the viewfinder; and
a second touch operation on a right hand side of the operation display portion.

2. The control device according to claim 1, wherein
the plurality of operation states comprises a plurality of touch operations, and
the plurality of touch operations corresponds to at least one of a left hand operation, a right hand operation, or a concurrent left hand and right hand operation.

3. The control device according to claim 1, wherein
the first operation state corresponds to a plurality of touch operations, and
the first operation state is based on a touch position on the operation display portion.

4. The control device according to claim 3, wherein
the first operation state is based on a region corresponding to the touch position, and
the region is among a plurality of regions on the operation display portion.

5. The control device according to claim 1, wherein the first operation state is based on a gesture operation on the operation display portion.

6. The control device according to claim 5, wherein the gesture operation includes a swiping operation on the operation display portion.

7. The control device according to claim 1, wherein the process control unit is further configured to execute a fourth process related to the shooting of the image, based on:
a second operation state of the plurality of operation states, wherein the second operation state is different from the first operation state, and
the detection of the proximity of the eye with respect to the viewfinder.

8. The control device according to claim 7, wherein the fourth process corresponds to a change of a shooting parameter.

9. The control device according to claim 7, wherein
the fourth process related to the shooting of the image is a process in which the viewfinder displays a guide display, and
the guide display describes a process of determination of one of composition or setting information related to the shooting of the image.

10. The control device according to claim 7, wherein the fourth process related to the shooting of the image is a process in which the viewfinder displays the image immediately after the shooting of the image.

11. The control device according to claim 1, wherein the process control unit is further configured to execute a fourth process related to the shooting of the image, based on:
the first operation state, and
non-detection of the proximity of the eye with respect to the viewfinder.

12. The control device according to claim 1, wherein the process control unit is further configured to execute a fourth process related to one of the shooting or the playback of the image, based on:
detection of a specific operation on the operation display portion, and
non-detection of the proximity of the eye with respect to the viewfinder.

13. The control device according to claim 12, wherein the process control unit is further configured to skip execution of the fourth process related to one of the shooting or the playback of the image, based on:
the detection of the specific operation on the operation display portion, and
the detection of the proximity of the eye with respect to the viewfinder.

14. The control device according to claim 1, wherein the process control unit is further configured to execute a fourth process, related to one of the shooting of the image or the playback of the image, based on detection of an operation on a touch operation portion on an outer peripheral portion of a shooting lens.

15. The control device according to claim 1, wherein the process control unit is further configured to execute a fourth process, related to one of the shooting of the image or the playback of the image, based on detection of depression of an operation button on a shooting device.

16. The control device according to claim 1, wherein the process control unit is further configured to execute a fourth process related to rating of the image being playback on the operation display portion, wherein the fourth process is executed based on:
the non-detection of the proximity of the eye with respect to the viewfinder; and
a third touch operation of swiping the operation display portion from up to down with each of a right hand and a left hand.

17. A control method, comprising:
executing a first process related to one of a shooting of an image or a playback of the image, wherein the first process is executed based on:

detection of a proximity of an eye with respect to a viewfinder, and
   detection of an operation state of a plurality of operation states on an operation display portion;
controlling the viewfinder to display a histogram, based on the detection of the proximity of the eye with respect to the viewfinder;
executing a second process related to magnification and display of the playback of the image on the operation display portion, wherein the second process is executed based on:
   non-detection of the proximity of the eye with respect to the viewfinder; and
   a first touch operation on the operation display portion; and
executing a third process related to magnification and display of a focus region that corresponds to a partial region centered around a position of focus of a subject, wherein
   the focus region is displayed in the viewfinder, and
   the third process is executed based on:
      the detection of the proximity of the eye with respect to the viewfinder; and
      a second touch operation on a right hand side of the operation display portion.

18. A non-transitory computer-readable medium having stored thereon, computer executable-instructions that, when executed by a processor, cause the processor to execute operations, the operations comprising:

executing a first process related to one of a shooting of an image or a playback of the image, wherein the first process is executed based on:
   detection of a proximity of an eye with respect to a viewfinder, and
   detection of an operation state of a plurality of operation states on an operation display portion;
controlling the viewfinder to display a histogram, based on the detection of the proximity of the eye with respect to the viewfinder;
executing a second process related to magnification and display of the playback of the image on the operation display portion, wherein the second process is executed based on:
   non-detection of the proximity of the eye with respect to the viewfinder; and
   a first touch operation on the operation display portion; and
executing a third process related to magnification and display of a focus region that corresponds to a partial region centered around a position of focus of a subject, wherein
   the focus region is displayed in the viewfinder, and
   the third process is executed based on:
      the detection of the proximity of the eye with respect to the viewfinder; and
      a second touch operation on a right hand side of the operation display portion.

* * * * *